United States Patent
Kanthak et al.

(10) Patent No.: US 9,596,294 B2
(45) Date of Patent: Mar. 14, 2017

(54) SYSTEM AND METHOD FOR COMMITTING TRANSACTIONS ON REMOTE SERVERS

(71) Applicant: Google Inc., Mountian View, CA (US)

(72) Inventors: Sebastian Kanthak, San Jose, CA (US); Alexander Lloyd, New York, NY (US); Chris Jorgen Taylor, Palo Alto, CA (US); Andrew Fikes, Los Altos, CA (US)

(73) Assignee: GOOGLE INC., Mountain View, CA (US)

( * ) Notice: Subject to any disclaimer, the term of this patent is extended or adjusted under 35 U.S.C. 154(b) by 467 days.

(21) Appl. No.: 13/892,169

(22) Filed: May 10, 2013

(65) Prior Publication Data
US 2013/0318146 A1 Nov. 28, 2013

Related U.S. Application Data

(60) Provisional application No. 61/646,135, filed on May 11, 2012.

(51) Int. Cl.
*G06F 15/16* (2006.01)
*H04L 29/08* (2006.01)
*G06F 9/46* (2006.01)

(52) U.S. Cl.
CPC ............. *H04L 67/10* (2013.01); *G06F 9/466* (2013.01)

(58) Field of Classification Search
CPC ........................................ G06F 9/466
USPC ......................... 709/201, 203, 248
See application file for complete search history.

(56) References Cited

U.S. PATENT DOCUMENTS

| | | | | |
|---|---|---|---|---|
| 5,701,480 | A | * | 12/1997 | Raz ............................... 718/101 |
| 5,764,877 | A | * | 6/1998 | Lomet et al. ................ 714/6.32 |
| 5,781,910 | A | * | 7/1998 | Gostanian et al. ........... 707/610 |
| 5,950,212 | A | | 9/1999 | Anderson et al. |
| 5,958,004 | A | | 9/1999 | Helland et al. |
| 2002/0169745 | A1 | * | 11/2002 | Hotti et al. ........................ 707/1 |

(Continued)

FOREIGN PATENT DOCUMENTS

GB 2335516 A 9/1999

OTHER PUBLICATIONS

Google Inc., International Preliminary Report on Patentability, PCT/US2013/040804, Nov. 11, 2014, 7 pgs.

(Continued)

*Primary Examiner* — Wing F Chan
*Assistant Examiner* — Joseph Maniwang
(74) *Attorney, Agent, or Firm* — Morgan, Lewis & Bockius LLP

(57) ABSTRACT

A system, computer-readable storage medium storing at least one program, and a computer-implemented method for committing transactions on remote servers is presented. Commit requests are issued to remote servers in a set of remote servers to request that the remote servers in the set of remote servers agree to commit a transaction at a first designated future time. When responses from the remote servers in the set of remote servers are received before a first abort time and indicate that all remote servers in the set of remote servers have agreed to commit the transaction at the first designated future time, commit commands are issued to the remote servers in the set of remote servers instructing the remote servers to perform the transaction at the first designated future time.

16 Claims, 20 Drawing Sheets

(56) References Cited

U.S. PATENT DOCUMENTS

2005/0004952 A1   1/2005   Suzuki et al.
2006/0167960 A1*  7/2006   Lomet .......................... 707/206
2012/0102006 A1*  4/2012   Larson et al. ................ 707/703

OTHER PUBLICATIONS

Google Inc., International Search Report and Written Opinion, PCT/US2013/040804, Sep. 6, 2013, 9 pgs.

* cited by examiner

SYSTEM AND METHOD FOR COMMITTING TRANSACTIONS ON REMOTE SERVERS

RELATED APPLICATIONS

This application claims priority to U.S. Provisional Application Ser. No. 61/646,135, filed May 11, 2012, entitled "System and Method for Committing Transactions on Remote Servers," which is incorporated by reference herein in its entirety.

TECHNICAL FIELD

The disclosed embodiments relate generally to committing transactions on remote servers.

BACKGROUND

In a distributed computing system, a plurality of servers are used to provide load balancing and/or provide low-latency points of access to nearby computer systems. For example, in a distributed storage system, data is replicated in storage clusters that are located across multiple geographical locations. In doing so, the availability of the data is increased and the network proximity of the data to client computer systems is decreased. When an atomic transaction needs to be performed across the distributed computing system, a two-phase commit protocol is typically used to ensure that the transaction is committed (or aborted) across the servers of the distributed computing system. Unfortunately, the two-phase commit protocol is a blocking protocol that prevents other transactions from being performed on the servers of the distributed computing system until a commit (or rollback) command is received. Thus, a server that is slow to respond to a commit request from a coordinating server blocks transactions from being performed on other servers who have already agreed to the transaction.

BRIEF DESCRIPTION OF THE DRAWINGS

The embodiments disclosed herein are illustrated by way of example, and not by way of limitation, in the figures of the accompanying drawings. Like reference numerals refer to corresponding parts throughout the drawings.

DETAILED DESCRIPTION

To address the aforementioned deficiencies of the two-phase commit protocol when applied to a distributed computing system, in some embodiments, a server issues commit requests to remote servers in a set of remote servers to request that the remote servers in the set of remote servers agree to commit a transaction at a designated future time. When responses from the remote servers in the set of remote servers are received before a predetermined abort time and indicate that all remote servers in the set of remote servers have agreed to commit the transaction at the designated future time, the server issues commit commands to the remote servers in the set of remote servers instructing the remote servers to perform the transaction at the first designated future time. These embodiments are described in more detail below.

Figure 1:
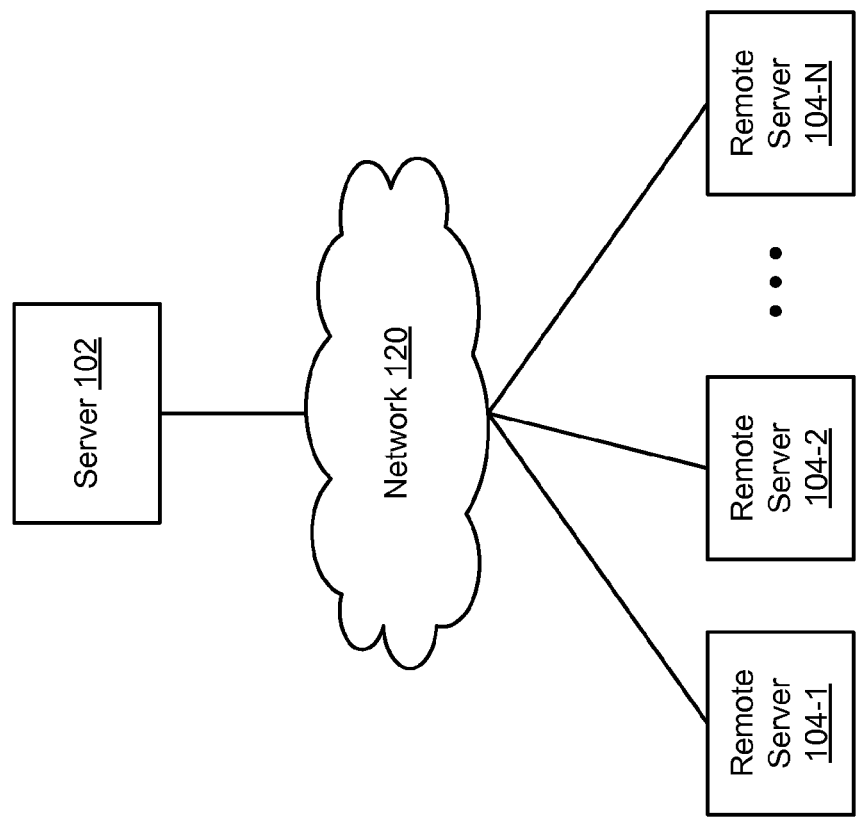
FIG. 1 is a block diagram illustrating a network system, according to some embodiments.

FIG. 1 is a block diagram illustrating a network system 100, according to some embodiments. The network system 100 includes a server 102 and a plurality of remote servers 104-1 to 104-N coupled to network 120. In some embodiments, the server 102 issues commit requests and commit commands to the remote servers 104-1 to 104-N to instruct the remote servers 104-1 to 104-N to commit transactions. In some embodiments, a respective transaction includes an operation to modify a schema of a database. In some embodiments, a respective transaction includes an operation to add an index to a database.

In some embodiments, a respective remote server is a compute node in a compute cluster of a distributed computing system. Note that a compute node includes one or more computer systems including one or more processors that provide computational resources for other computer systems. In some embodiments, a respective remote server is a storage node in a storage cluster of a distributed storage system. Note that although the embodiments described herein refer to "remote" servers (e.g., servers in a different data center, a different building, and/or a different geographic location, etc., as the server 102), the embodiments described herein may be applied to "local" servers (e.g., servers in the same data center, the same building, and/or the same geographic location, etc., as the server 102).

In some embodiments, the server 102 is a compute node in a compute cluster of the distributed computing system. In some embodiments, the server 102 is a storage node in a storage cluster of the distributed storage system.

Network 120 may generally include any type of wired or wireless communication channel capable of coupling together computing nodes. This includes, but is not limited to, a local area network, a wide area network, or a combination of networks. In some embodiments, network 120 includes the Internet.

Note that although FIG. 1 shows one instance of the server 102, multiple servers may be present in the network system 100. For example, the server 102 may include a plurality of distributed servers. Similarly, each of the remote servers 104 may represent multiple remote servers. For example, the remote server 104-1 may include a plurality of distributed servers. Distributed servers may provide load balancing and/or may provide low-latency points of access to nearby computer systems. The distributed servers may be located within a single location (e.g., a data center, a building, etc.) or may be geographically distributed across multiple locations (e.g., data centers at various geographical locations, etc.). Also note that although the embodiments described herein refer to the server 102, the embodiments may be applied to multiple servers. Furthermore, note that the term "server" and "remote server" are relative terms that are interchangeable. In this specification, the term "server" is used to refer to a computer system (e.g., the server 102) that issues commit requests and commit commands to other computer systems (e.g., the remote servers 104-1 to 104-N, etc.). Thus, in some instances, the server 102 may be the computer system that issues commit request and commit commands to other computer systems (e.g., the remote servers 104-1 to 104-N). In other instances, the remote server 104-1 (or another one of the remote server 104-2 to 104-N, etc.) may be the computer system that issues commit requests and commit commands to other computer systems (e.g., the server 102, the remote servers 104-2 to 104-N, etc.).

Figure 2A:
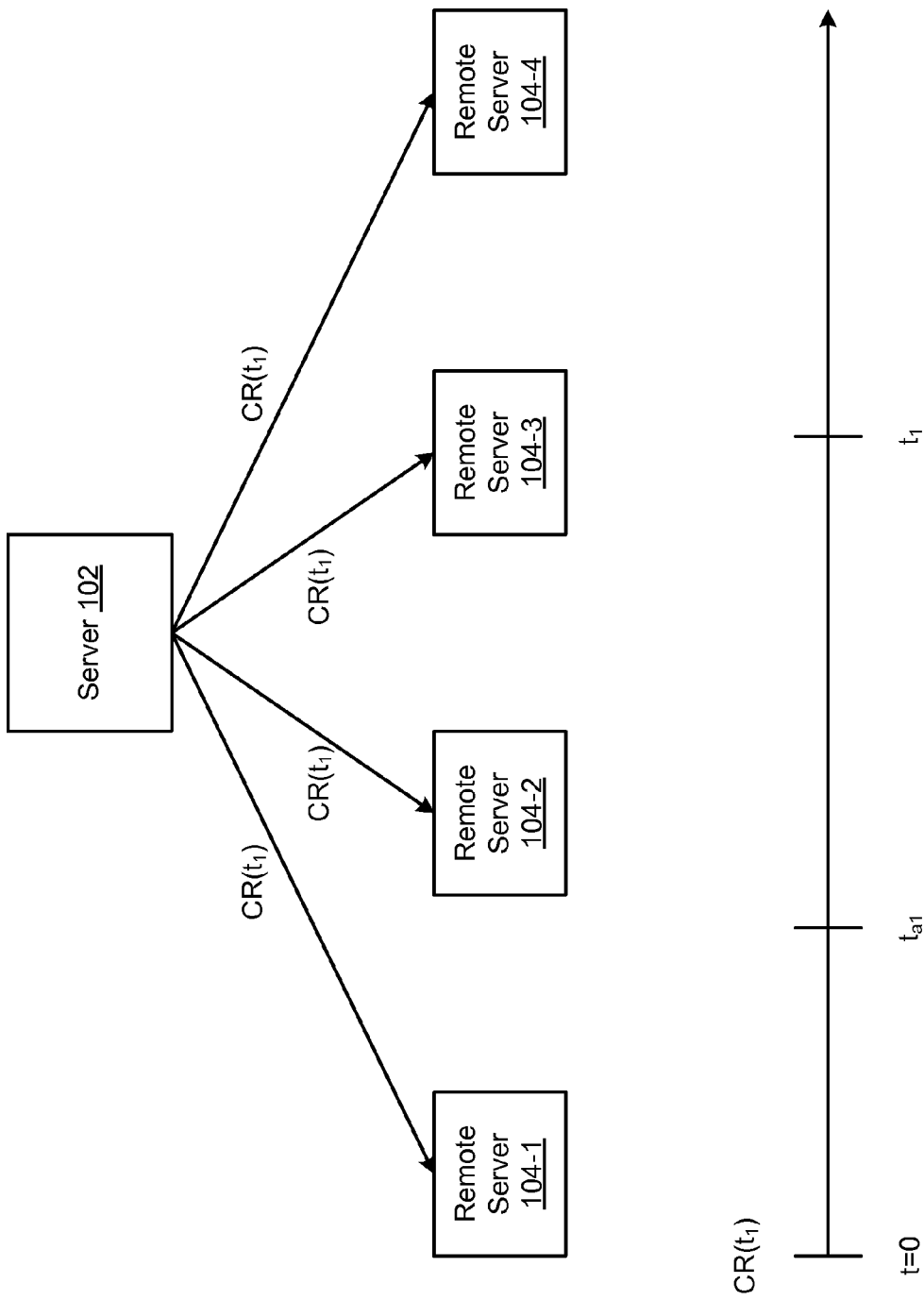
FIG. 2A is a block diagram illustrating an example process for committing transactions on remote servers, according to some embodiments.

In FIG. 2A, the server 102 issues commit requests $CR(t_1)$ to the remote servers 104-1 to 104-4 requesting that the remote servers 104-1 to 104-4 agree to commit a transaction at a designated future time $t_1$. The timeline in FIG. 2A includes three time points: t=0 is the time when the server 102 issues the commit requests $CR(t_1)$ to the remote server 104-1 to 104-4, $t_{a1}$ is the predetermined abort time, $t_1$ is the designated future time that the server 102 is requesting the remote servers 104-1 to 104-4 to agree to perform the transaction. Note that the predetermined abort time is the time at which the server 102 must receive all of the responses to the commit requests in order for the server 102 to issue the commit command. For example, if the server 102 does not receive all of the responses to the commit requests before the predetermined abort time $t_{a1}$, the server 102 aborts the transaction.

Figure 2B:
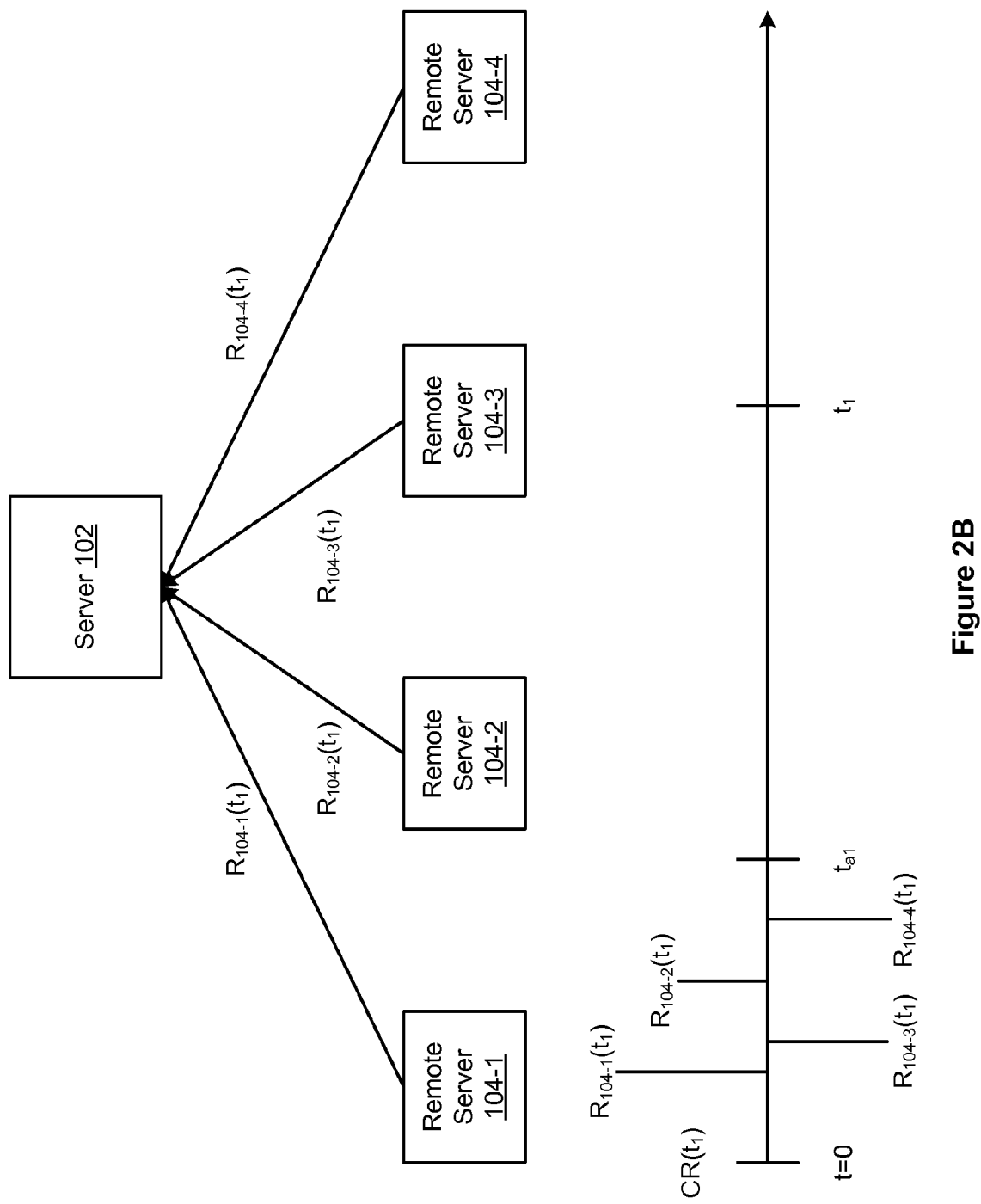
FIG. 2B continues the process illustrated in FIG. 2A, according to some embodiments.

In FIG. 2B, the remote servers 104-1 to 104-4 send responses $R_{104-1}(t_1)$ to $R_{104-4}(t_1)$, respectively, to the server 102 responding to the commit request $CR(t_1)$ indicating that the remote servers 104-1 to 104-4 agree to commit the transaction at the designated future time $t_1$. In this example, the server 102 receives the responses $R_{104-1}(t_1)$ to $R_{104-4}(t_1)$ from the remote servers 104-1 to 104-4, respectively, before the predetermined abort time $t_{a1}$. Thus, the server 102 proceeds with the transaction.

Figure 2C:
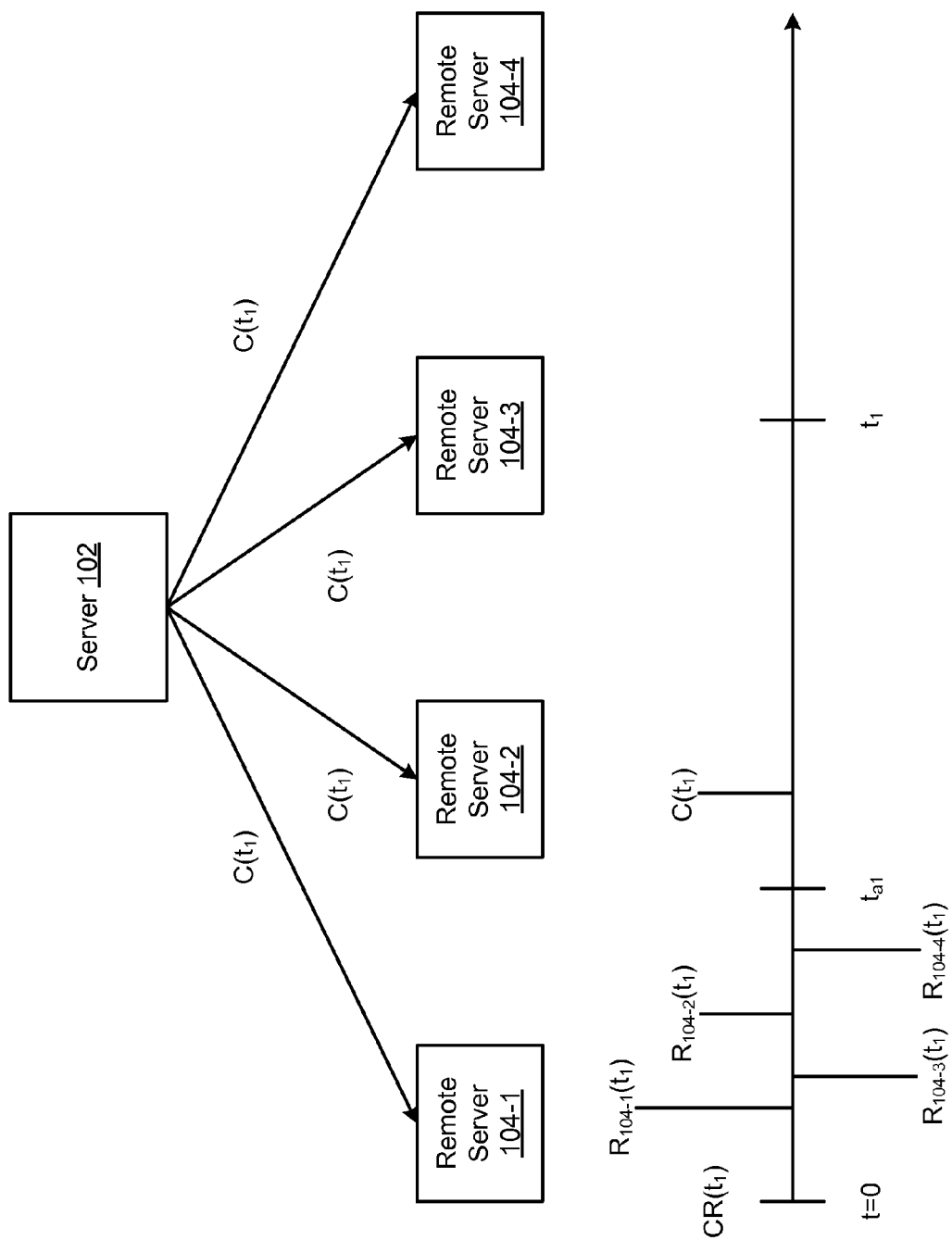
FIG. 2C continues the process illustrated in FIG. 2B, according to some embodiments.

In FIG. 2C, the server 102 issues commit commands $C(t_1)$ to the remote servers 104-1 to 104-4 instructing the remote servers 104-1 to 104-4 to perform the transaction at the designated future time $t_1$. The remote servers 104-1 to 104-4 then perform the transaction at the designated future time $t_1$.

In some embodiments, when a remote server does not agree to committing the transaction at the designated future time, the remote server responds to the server 102 with a new designated future time at which the remote server can commit the transaction. The server 102 then reissues the commit requests using the new designated future time. These embodiments are described in more detail below with reference to FIGS. 3A-3E.

Figure 3A:
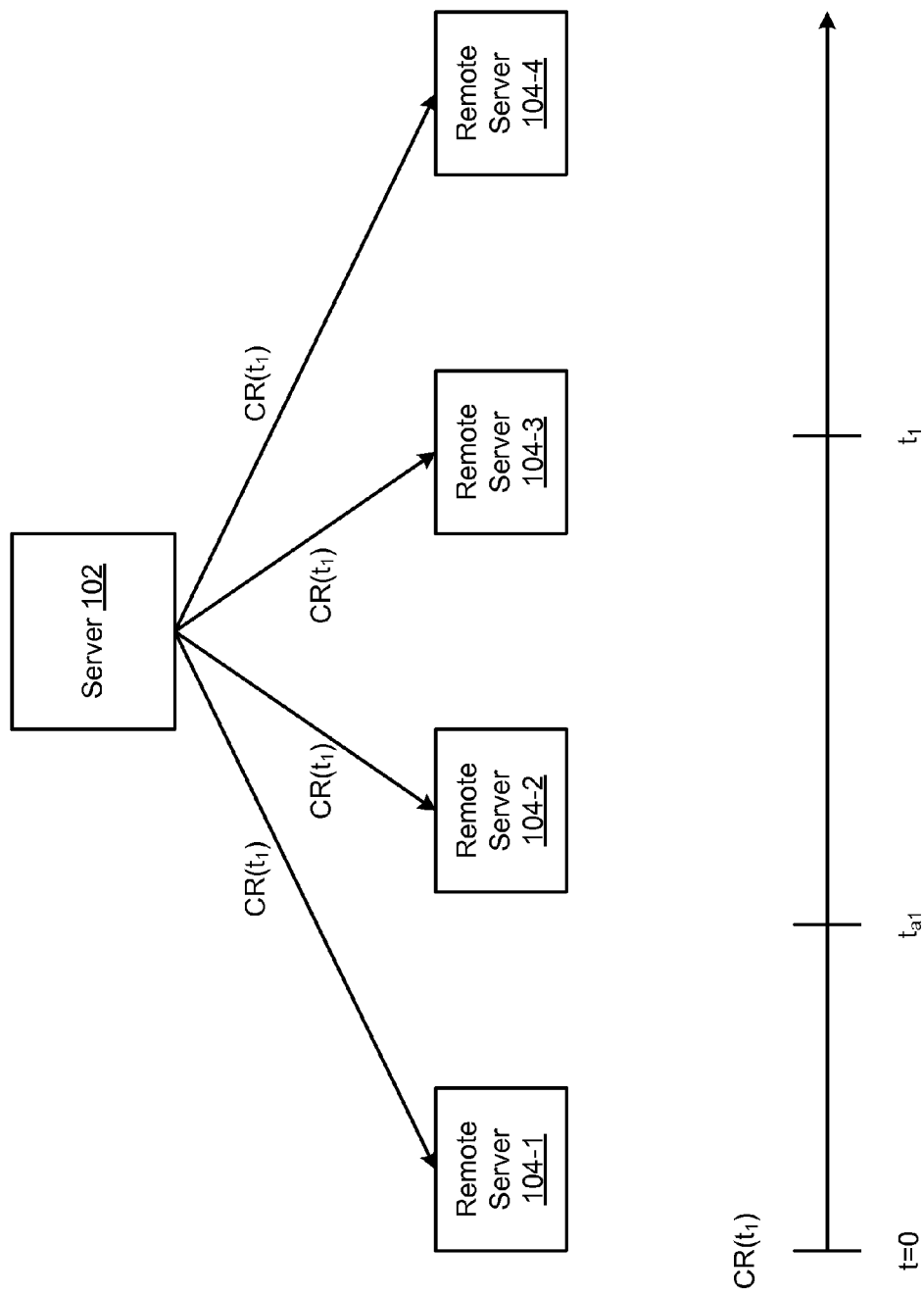
FIG. 3A is a block diagram illustrating another example process for committing transactions on remote servers, according to some embodiments.

In FIG. 3A, the server 102 issues commit requests $CR(t_1)$ to the remote server 104-1 to 104-4 requesting that the remote servers 104-1 to 104-4 to agree to commit a transaction at a designated future time $t_1$. Similar to the timeline in FIG. 2A, the timeline in FIG. 3A includes three time points: t=0 is the time when the server 102 issues the commit requests $CR(t_1)$ to the remote server 104-1 to 104-4, $t_{a1}$ is the predetermined abort time, $t_1$ is the designated future time that the server 102 is requesting the remote servers 104-1 to 104-4 to agree to perform the transaction.

Figure 3B:
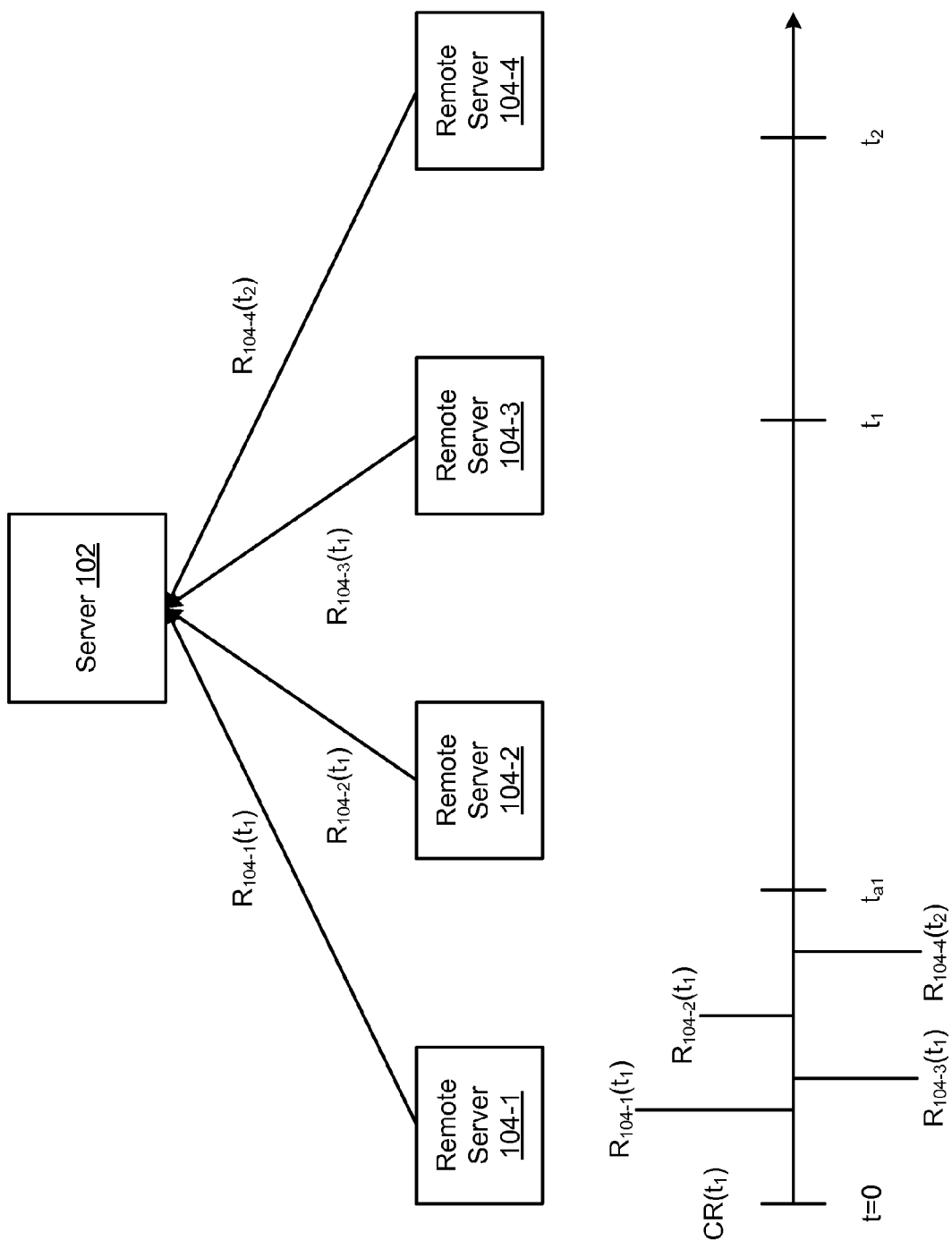
FIG. 3B continues the process illustrated in FIG. 3A, according to some embodiments.

In FIG. 3B, the remote servers 104-1 to 104-3 send responses $R_{104-1}(t_1)$ to $R_{104-3}(t_1)$, respectively, to the server 102 responding to the commit request $CR(t_1)$ indicating that the remote servers 104-1 to 104-3 agree to commit the transaction at the designated future time $t_1$. However, the remote server 104-4 sends a response $R_{104-4}(t_2)$ to the server 102 indicating that the remote server 104-4 does not agree to commit the transaction at the designated future time $t_1$, but that the remote server 104-4 can agree to commit the transaction at a new designated future time $t_2$. Thus, although the server 102 receives the responses $R_{104-1}(t_1)$ to $R_{104-3}(t_1)$ and $R_{104-4}(t_2)$ from the remote servers 104-1 to 104-4, respectively, before the predetermined abort time $t_{a1}$, the server 102 does not proceed with the transaction because the remote server 104-4 did not agree to commit the transaction at the designated future time $t_1$.

Figure 3C:
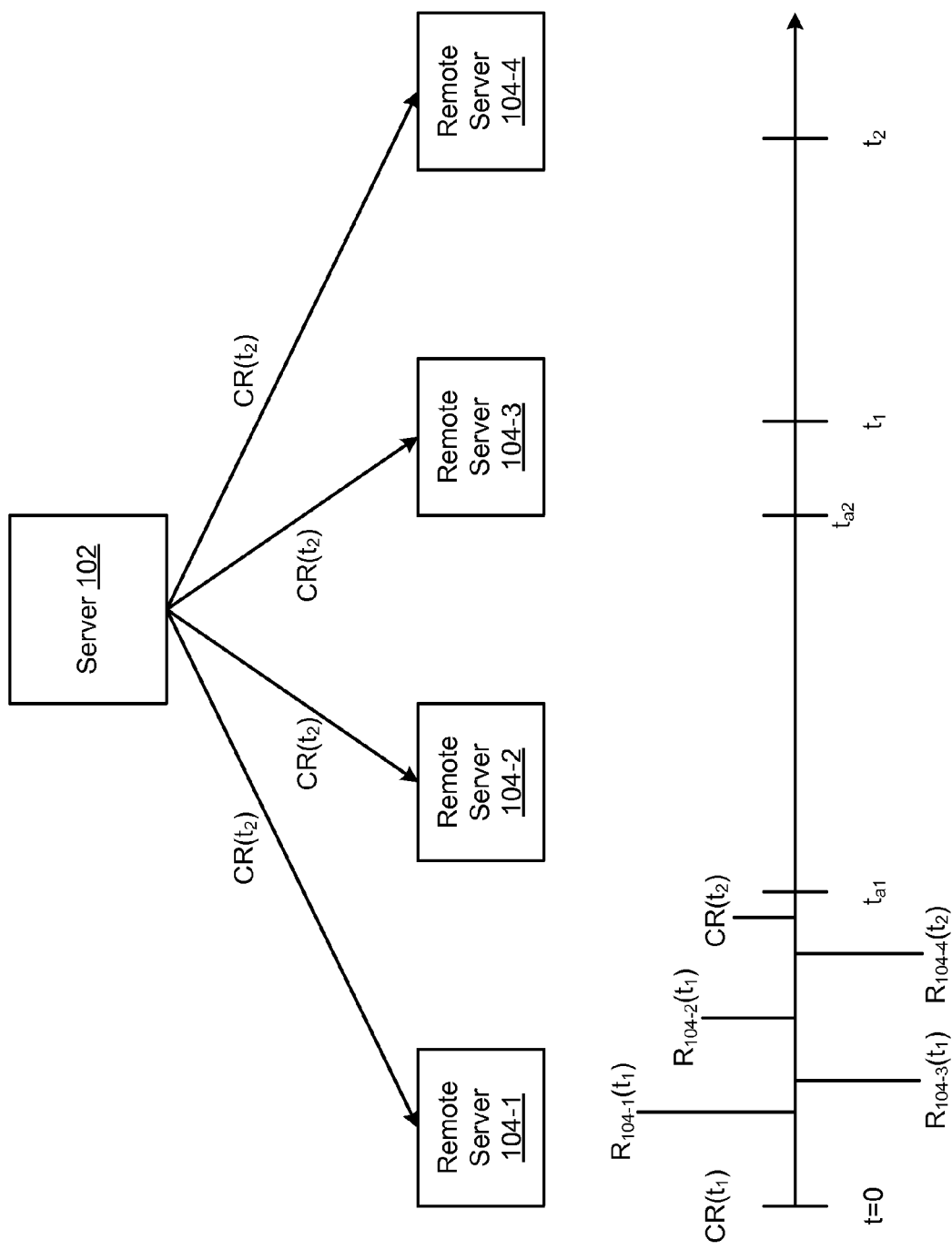
FIG. 3C continues the process illustrated in FIG. 3B, according to some embodiments.

In FIG. 3C, in response to receiving the response $R_{104-4}(t_2)$ from the remote server 104-4, the server 102 issues abort commands to the remote servers 104-1 to 104-4 instructing the remote servers 104-1 to 104-4 to abort and/or roll back the transaction and issues commit requests $CR(t_2)$ to the remote server 104-1 to 104-4 requesting that the remote servers 104-1 to 104-4 to agree to commit a transaction at the designated future time $t_2$. As illustrated in the timeline of FIG. 3C, the designated future time $t_2$ occurs after the designated future time $t_1$. Furthermore, the server 102 selects a new predetermined abort time $t_{a2}$, which occurs after the predetermined abort time $t_{a1}$.

In some embodiments, when the server 102 receives multiple new designated future times from multiple remote servers, the server 102 selects the new designated future time that occurs the farthest in the future.

Figure 3D:
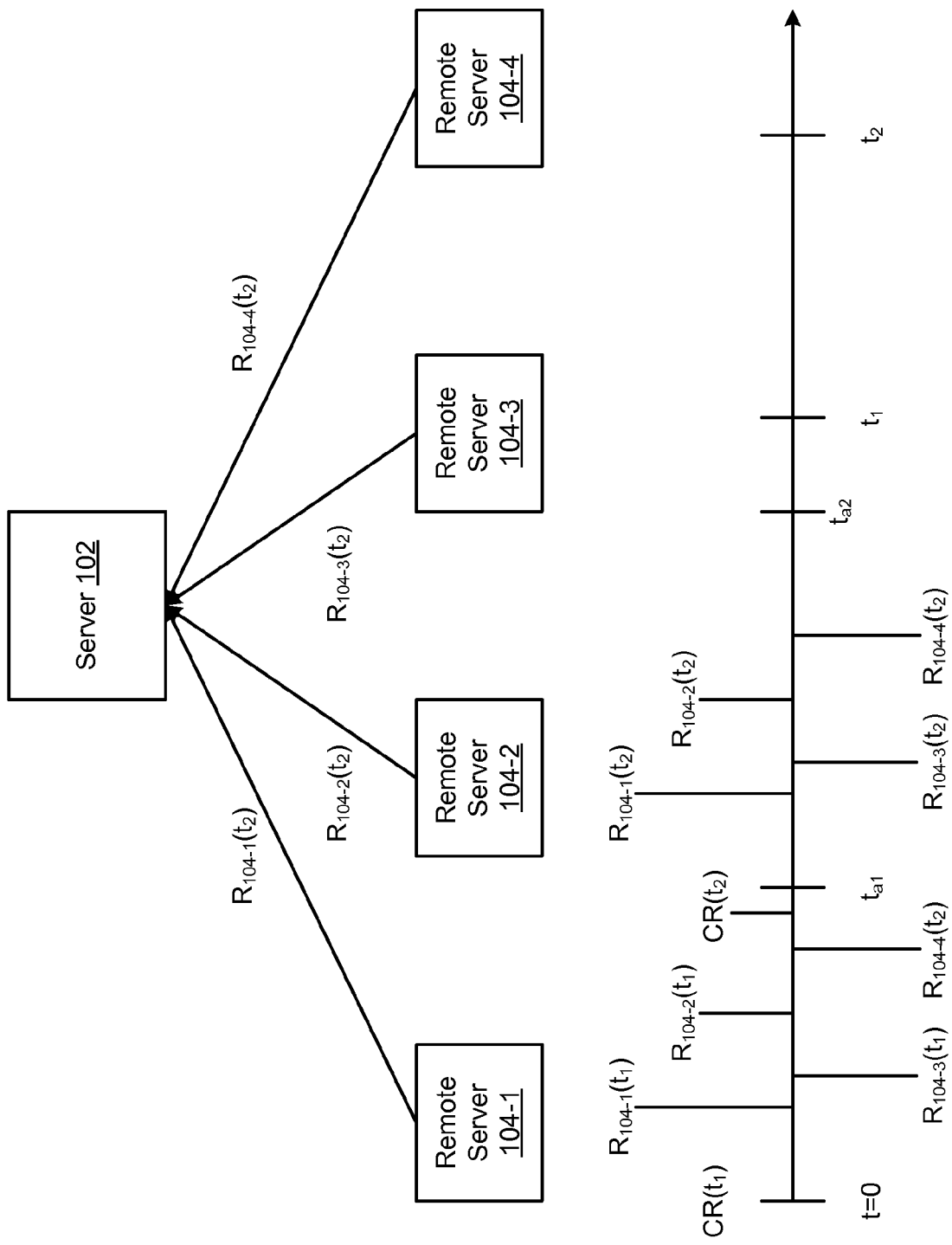
FIG. 3D continues the process illustrated in FIG. 3C, according to some embodiments.

In FIG. 3D, the remote servers 104-1 to 104-4 send responses $R_{104-1}(t_2)$ to $R_{104-4}(t_2)$, respectively, to the server 102 responding to the commit request $CR(t_2)$ indicating that the remote servers 104-1 to 104-4 agree to commit the transaction at the designated future time $t_2$. In this example, the server 102 receives the responses $R_{104-1}(t_2)$ to $R_{104-3}(t_2)$ and $R_{104-4}(t_2)$ from remote servers 104-1 to 104-4, respectively, by the new predetermined abort time $t_{a2}$. Thus, the server 102 proceeds with the transaction.

Figure 3E:
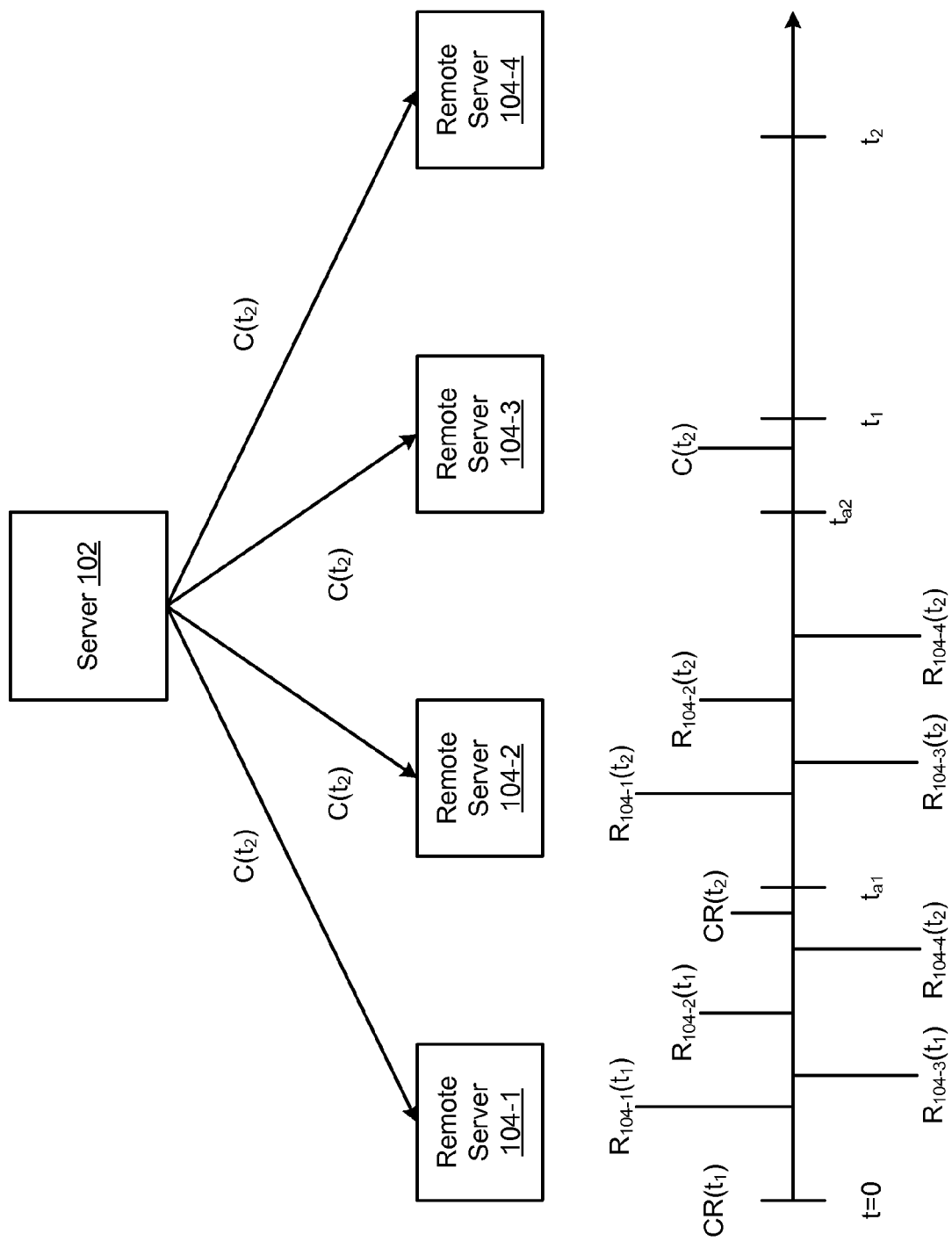
FIG. 3E continues the process illustrated in FIG. 3D, according to some embodiments.

In FIG. 3E, the server 102 issues commit commands $C(t_2)$ to the remote servers 104-1 to 104-4 instructing the remote servers 104-1 to 104-4 to perform the transaction at the designated future time $t_2$. The remote servers 104-1 to 104-4 then perform the transaction at the designated future time $t_2$.

In some embodiments, in response to receiving the response $R_{104-4}(t_2)$ from the remote server 104-4 (e.g., as illustrated in FIG. 3B), the server 102 issues commit commands $C(t_2)$ to the remote servers 104-1 to 104-4 instructing the remote servers 104-1 to 104-4 to perform the transaction at the designated future time $t_2$ (e.g., as illustrated in FIG. 3E). Thus, in these embodiments, the server does not perform the operations illustrated in FIG. 3C and FIG. 3D, but instead performs the operations illustrated in FIGS. 3B and 3E. The operations illustrated in FIGS. 3C and 3D can be omitted because (1) by sending the responses $R_{104-1}(t_1)$, $R_{104-2}(t_1)$, and $R_{104-3}(t_1)$, the remote servers 104-1, 104-2, and 104-3 have agreed to abort all transactions that have time periods of execution that include or occur after the designated future time $t_1$ until they receive the commit commands (e.g., see the discussion with respect to FIGS. 5A and 5B below) and (2) the designated future time $t_2$ is greater than the designated future time $t_1$.

In some embodiments, when at least one remote server does not respond to the commit request before the predetermined abort time, the server 102 selects a new designated future time and reissues the commit requests to the remote servers. These embodiments are described in more detail below with reference to FIGS. 4A-4E.

Figure 4A:
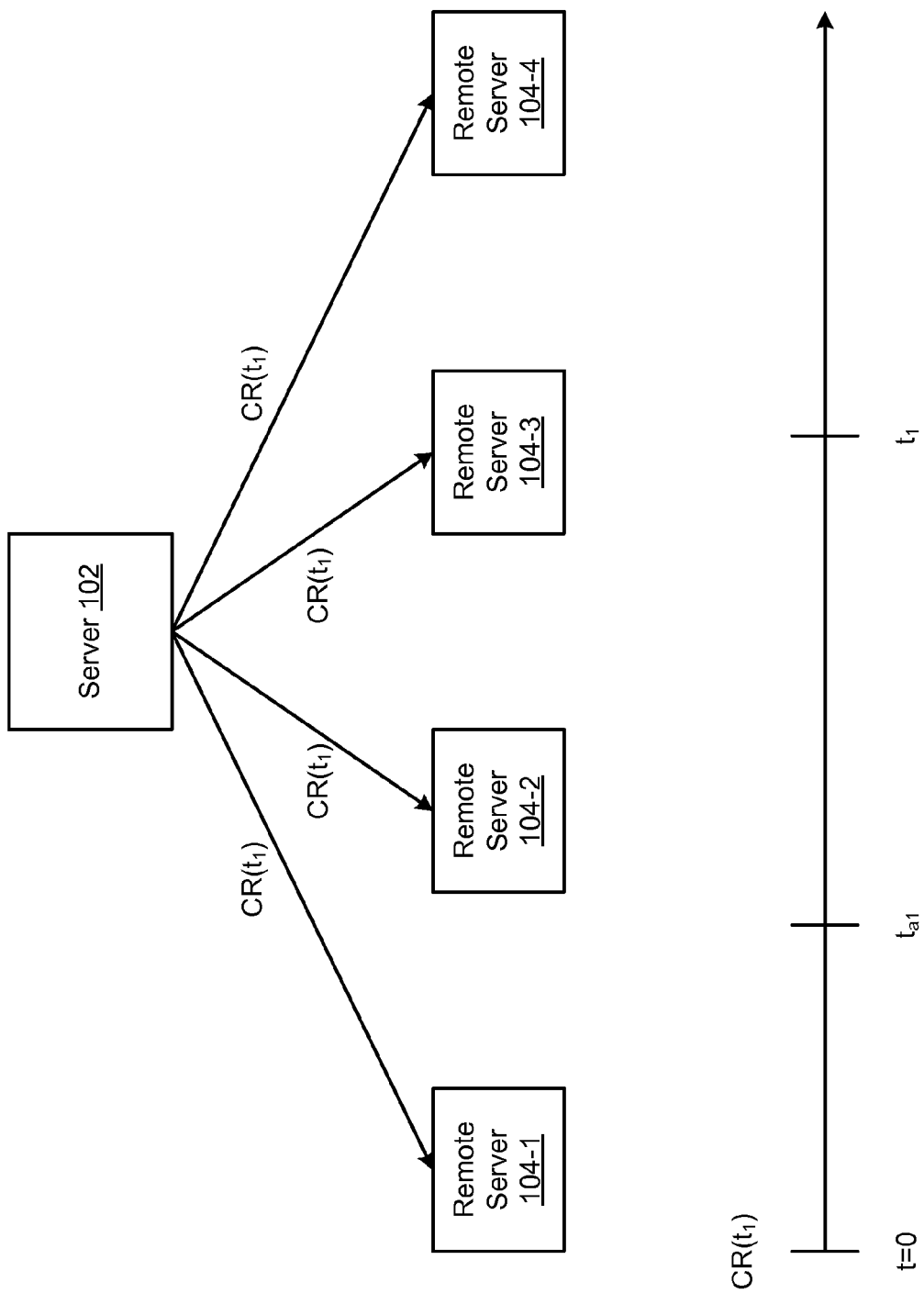
FIG. 4A is a block diagram illustrating another example process for committing transactions on remote servers, according to some embodiments.

In FIG. 4A, the server 102 issues commit requests $CR(t_1)$ to the remote server 104-1 to 104-4 requesting that the remote servers 104-1 to 104-4 to agree to commit a transaction at a designated future time $t_1$. Similar to the timeline in FIGS. 2A and 3A, the timeline in FIG. 4A includes three time points: t=0 is the time when the server 102 issues the commit requests $CR(t_1)$ to the remote server 104-1 to 104-4, $t_{a1}$ is the predetermined abort time, $t_1$ is the designated future time that the server 102 is requesting the remote servers 104-1 to 104-4 to agree to perform the transaction.

Figure 4B:
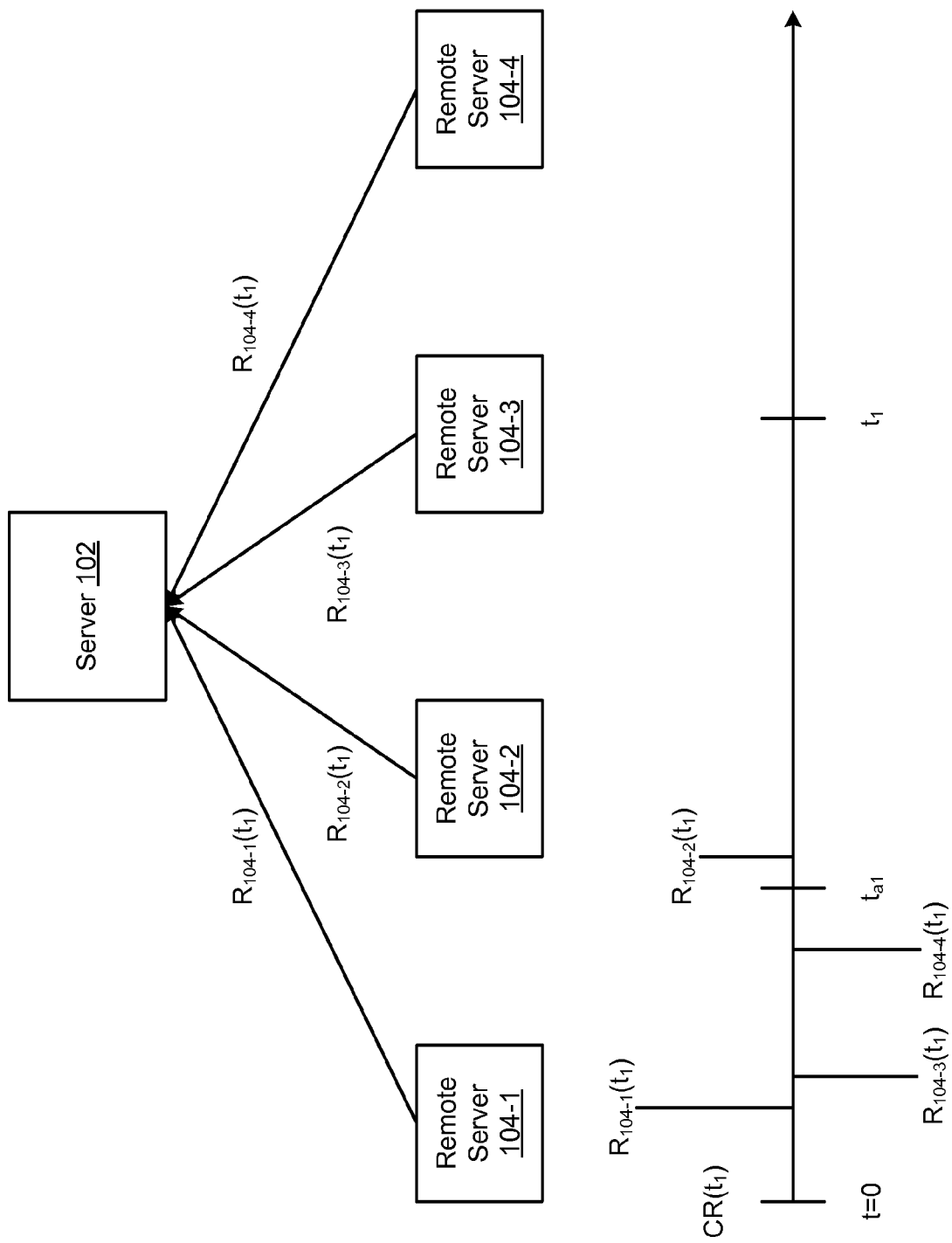
FIG. 4B continues the process illustrated in FIG. 4A, according to some embodiments.

In FIG. 4B, the remote servers 104-1 to 104-4 send responses $R_{104-1}(t_1)$ to $R_{104-4}(t_1)$, respectively, to the server 102 responding to the commit request $CR(t_1)$ indicating that the remote servers 104-1 to 104-4 agree to commit the transaction at the designated future time $t_1$. However, the server 102 does not receive the response $R_{104-2}(t_1)$ from the remote server 104-2 until after the predetermined abort time $t_{a1}$. Thus, the server 102 does not proceed with the transaction because the server 102 did not receive the response $R_{104-2}(t_1)$ from the remote server 104-2 before the predetermined abort time $t_{a1}$.

Figure 4C:
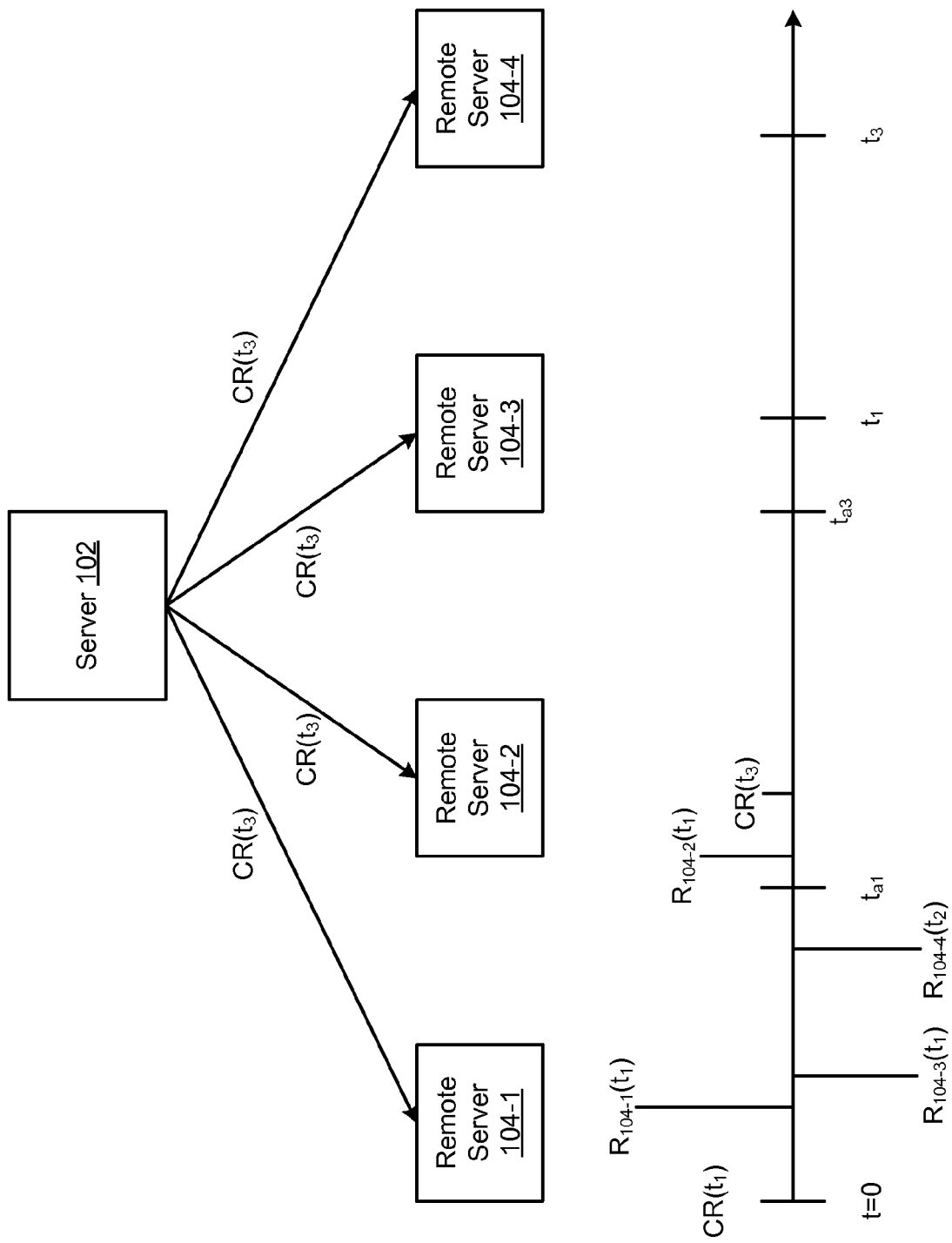
FIG. 4C continues the process illustrated in FIG. 4B, according to some embodiments.

In FIG. 4C, in response to not receiving the response $R_{104-2}(t_1)$ from the remote server 104-4 before the predetermined abort time $t_{a1}$, the server 102 issues an abort command to the remote servers 104-1 to 104-4 instructing the remote servers 104-1 to 104-4 to abort and/or roll back the transaction and selects a new designated future time $t_3$ and issues commit requests $CR(t_3)$ to the remote server 104-1 to 104-4 requesting that the remote servers 104-1 to 104-4 to agree to commit a transaction at the new designated future time $t_3$. As illustrated in the timeline of FIG. 4C, the new designated future time $t_3$ occurs after the designated future time $t_1$. Furthermore, the server 102 selects a new predetermined abort time $t_{a3}$, which occurs after the predetermined abort time $t_{a1}$.

Figure 4D:
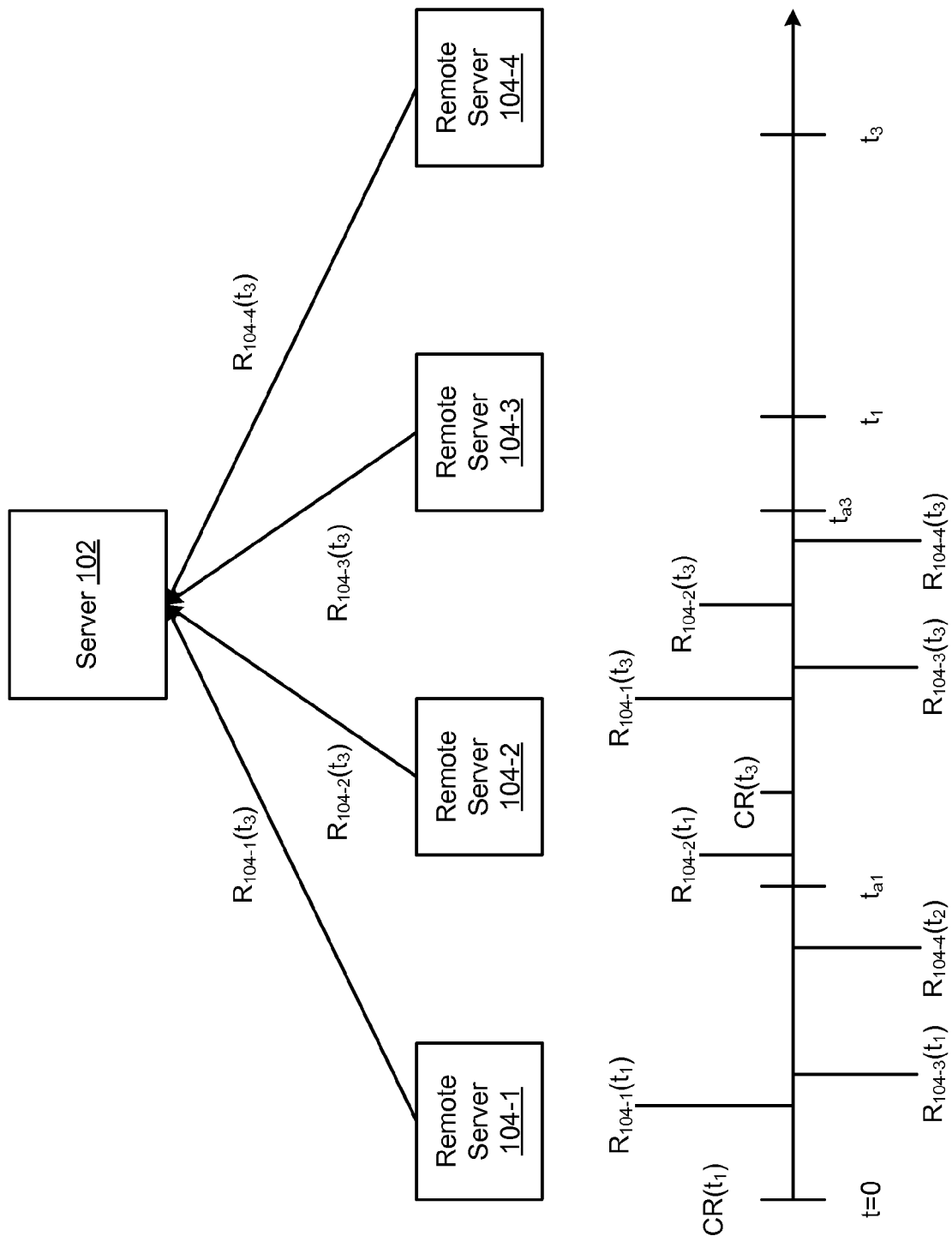
FIG. 4D continues the process illustrated in FIG. 4C, according to some embodiments.

In FIG. 4D, the remote servers 104-1 to 104-4 send responses $R_{104-1}(t_3)$ to $R_{104-4}(t_3)$, respectively, to the server 102 responding to the commit request $CR(t_3)$ indicating that the remote servers 104-1 to 104-4 agree to commit the transaction at the new designated future time $t_3$. In this example, the server 102 receives the responses $R_{104-1}(t_3)$ to $R_{104-3}(t_3)$ and $R_{104-4}(t_2)$ from remote servers 104-1 to 104-4, respectively, by the new predetermined abort time $t_{a3}$. Thus, the server 102 proceeds with the transaction.

Figure 4E:
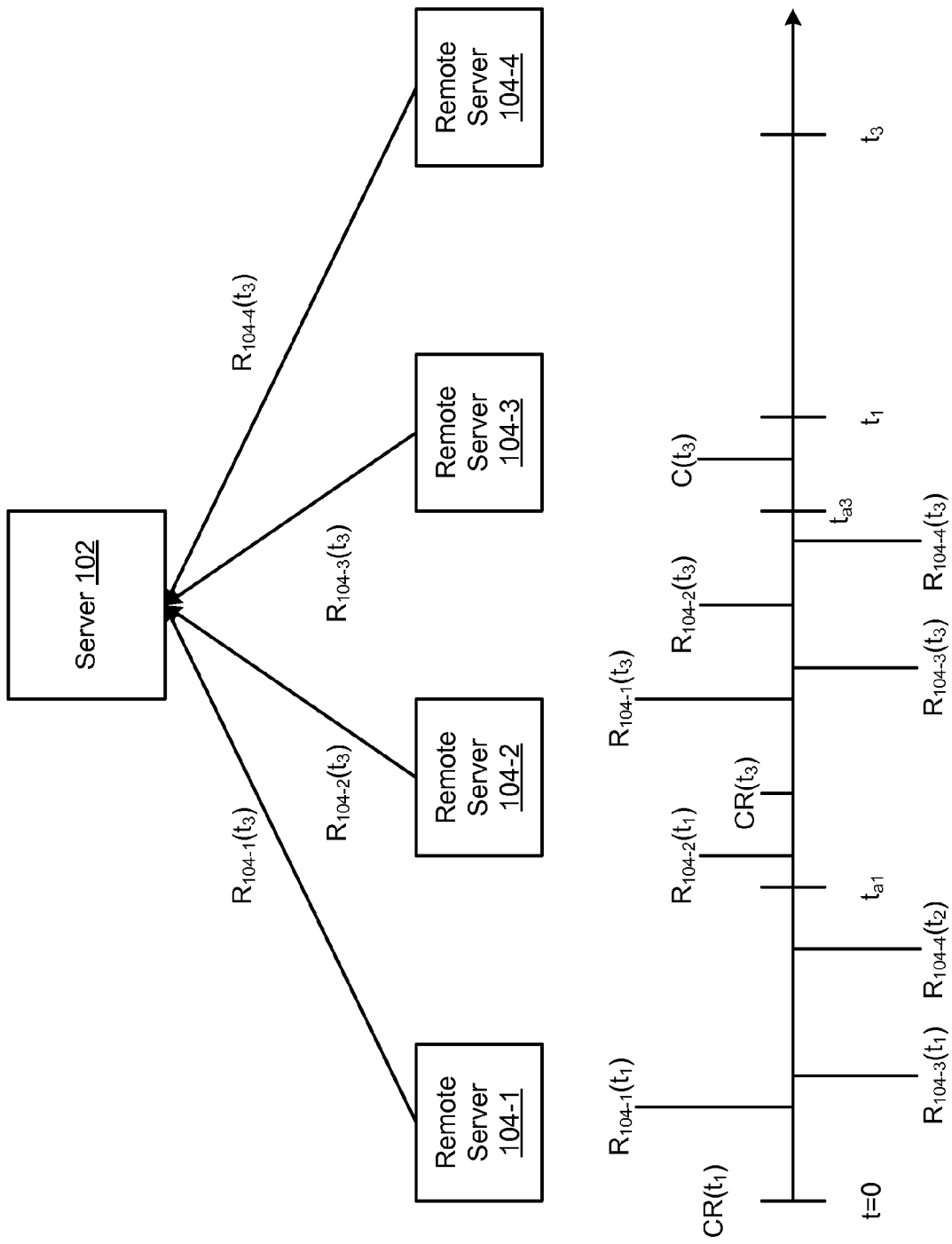
FIG. 4E continues the process illustrated in FIG. 4D, according to some embodiments.

In FIG. 4E, the server 102 issues commit commands $C(t_3)$ to the remote servers 104-1 to 104-4 instructing the remote servers 104-1 to 104-4 to perform the transaction at the new designated future time $t_3$ The remote servers 104-1 to 104-4 then perform the transaction at the new designated future time $t_3$.

Figure 5A:
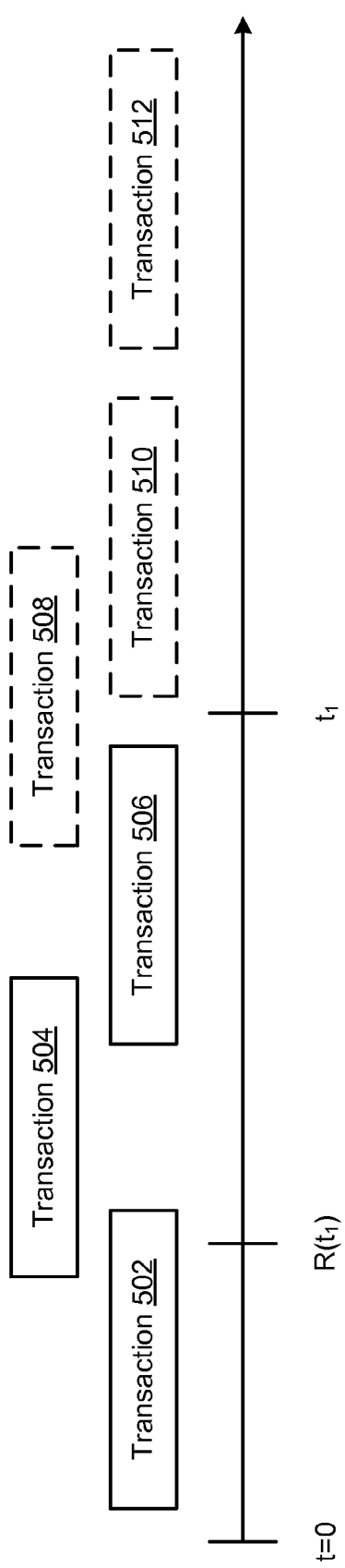
FIG. 5A is a block diagram illustrating an example timeline of transactions being performed on a remote server, according to some embodiments.
Figure 5B:
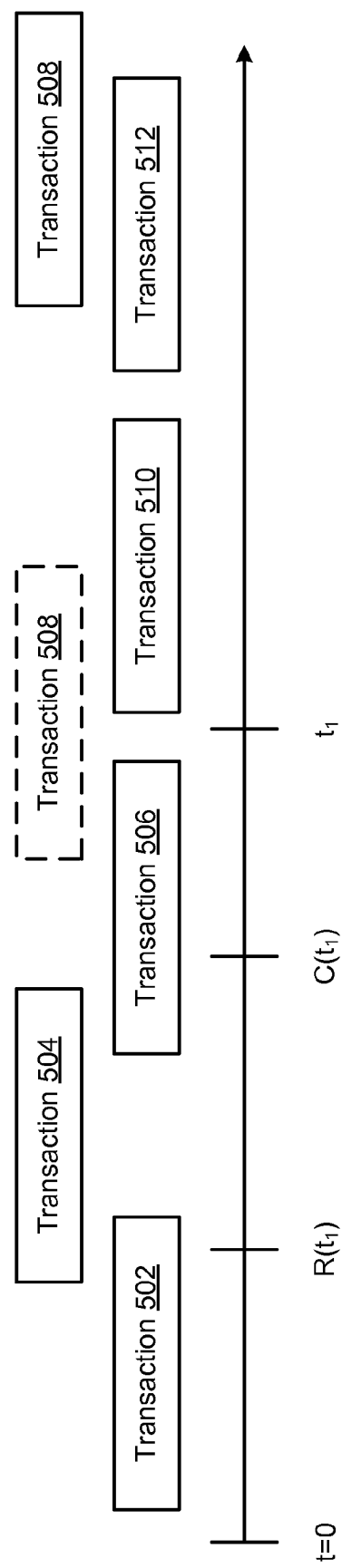
FIG. 5B is a block diagram illustrating another example timeline of transactions being performed on a remote server, according to some embodiments.

FIGS. 5A and 5B are block diagrams illustrating example timelines of transactions being performed on a remote server, according to some embodiments. In this example, the remote server agreed to commit a transaction at a designated future time $t_1$ by issuing a response $R(t_1)$ to the server 102. In some embodiments, the remote server commits other transactions whose time periods of execution occur before the designated future time $t_1$. For example, in FIG. 5, the remote server performs and commits other transactions 502, 504 and 506 because the time periods of execution for these other transactions occur before the designated future time $t_1$. However, the remote server aborts (or does not perform) the other transactions 508, 510 and 512 because these other transactions have time periods of execution that include or occur after the designated future time $t_1$.

In FIG. 5B, the remote server receives a commit command $C(t_1)$ from the server 102 instructing the remote server to commit the transaction at the designated future time $t_1$. In response to receiving the commit command $C(t_1)$, the remote server commits other transactions whose time periods of execution do not include the designated future time $t_1$. Specifically, the remote server commits the other transactions 502, 504, 506, 510, and 512. However, although the remote server performs transaction 508, the remote server does not commit the other transaction 508 (e.g., the remote server aborts and rolls back the other transaction 508) because the other transaction 508 starts before the designated future time $t_1$ and ends after the designated future time $t_1$. In other words, since the time period of execution for the other transaction 508 includes the designated future time $t_1$, the remote server does not commit the other transaction 508. In some embodiments, the remote server performs (e.g., re-executes) the other transaction 508 after the designated future time $t_1$.

In summary, FIG. 5A illustrates the case when the remote server has agreed to commit the transaction at the designated future time $t_1$, but has not yet received the commit command from the server 102. Thus, the remote server only commits other transactions whose time periods of execution occur before the designated future time $t_1$. In other words, by agreeing to commit the transaction at the designated future time $t_1$, the remote server also agrees to not commit any other transactions whose time periods of execution include or occur after the designated future time $t_1$. The reason that the remote server aborts (or does not perform) other transactions whose time periods of execution occur after the designated future time $t_1$ is that the server 102 may still change the designated future time to a later time (e.g., as described with reference to FIGS. 3A-3E and 4A-4E). Furthermore, the remote server cannot commit future transactions because these future transactions may depend on the transaction that the remote server has agreed to commit at the designated future time $t_1$ (but has not yet applied). For example, if the transaction that the remote server has agreed to commit at the designated future time $t_1$ is a transaction to change the schema of a database (or a transaction to create an index), the future transactions cannot be committed until the change to the schema of the database is completed (or the index has been created). In FIG. 5B, the remote server has received the commit command from the server 102. Thus, the remote server can now commit other transactions whose time periods of execution do not include the designated future time $t_1$. In other words, since the remote server knows that the transaction will be committed at the designated future time $t_1$, the remote server can safely commit other transactions whose time periods of execution do not include the designated future time $t_1$.

Figure 6:
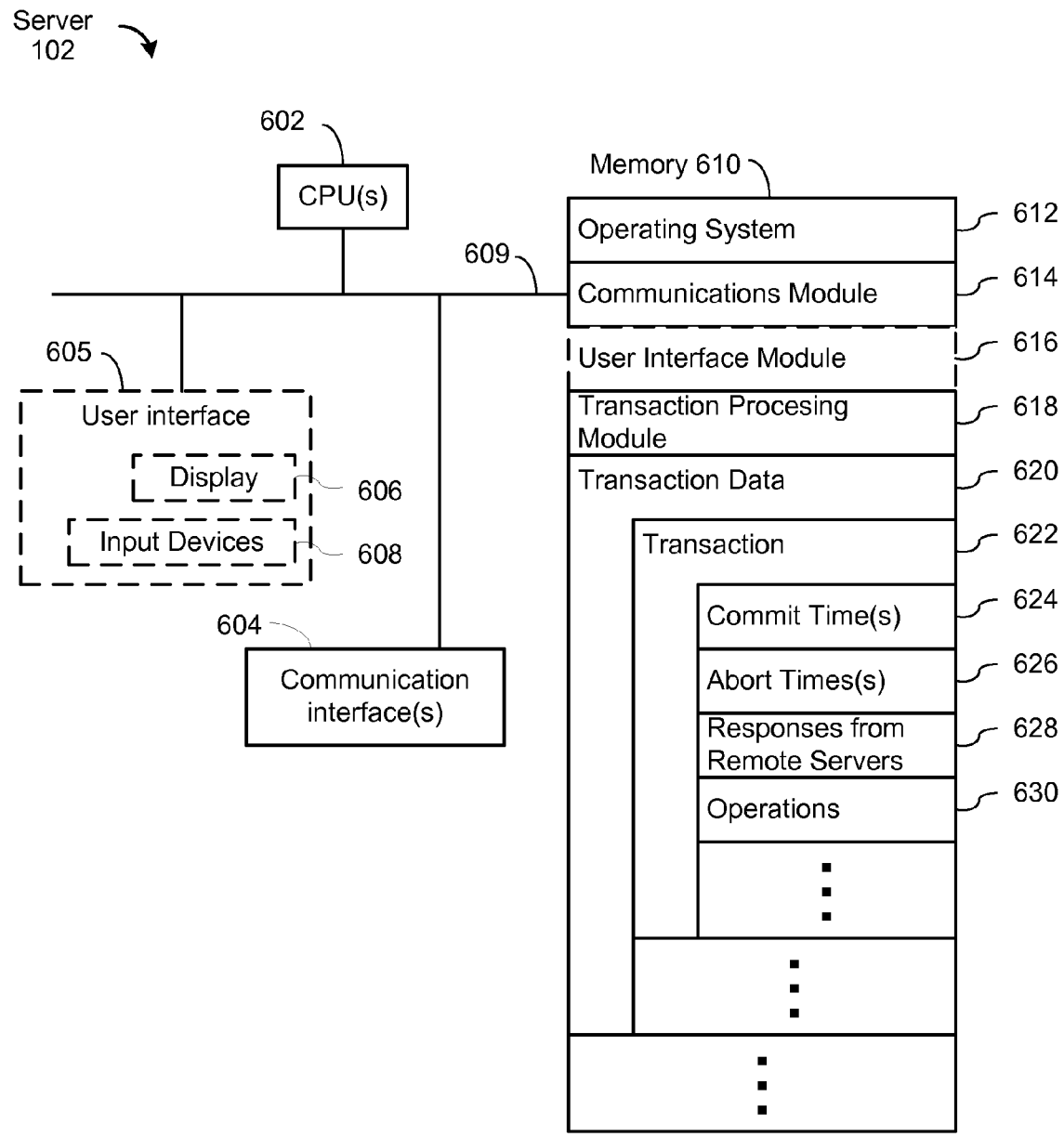
FIG. 6 is a block diagram illustrating a server, according to some embodiments.

FIG. 6 is a block diagram illustrating the server 102, according to some embodiments. The server 102 typically includes one or more processing units (CPU's, sometimes called processors) 602 for executing programs (e.g., programs stored in memory 610), one or more network or other communications interfaces 604, memory 610, and one or more communication buses 609 for interconnecting these components. The communication buses 609 may include circuitry (sometimes called a chipset) that interconnects and controls communications between system components. The server 102 optionally includes (but typically does not include) a user interface 605 comprising a display device 606 and input devices 608 (e.g., keyboard, mouse, touch screen, keypads, etc.). Memory 610 includes high-speed random access memory, such as DRAM, SRAM, DDR RAM or other random access solid state memory devices; and typically includes non-volatile memory, such as one or more magnetic disk storage devices, optical disk storage devices, flash memory devices, or other non-volatile solid state storage devices. Memory 610 optionally includes one or more storage devices remotely located from the CPU(s) 602. Memory 610, or alternately the non-volatile memory device(s) within memory 610, comprises a non-transitory computer readable storage medium. In some embodiments, memory 610 or the computer readable storage medium of memory 610 stores the following programs, modules and data structures, or a subset thereof:

- an operating system 612 that includes procedures for handling various basic system services and for performing hardware dependent tasks;
- a communication module 614 that is used for connecting the server 102 to other computers via the one or more communication interfaces 604 (wired or wireless) and one or more communication networks, such as the Internet, other wide area networks, local area networks, metropolitan area networks, and so on;
- a user interface module 616 that receives commands from the user via the input devices 608 and generates user interface objects in the display device 606;
- a transaction processing module 618 that issues commit requests and commit commands to remote servers, and/or that performs transactions, as described herein; and
- transaction data 620 including data for transaction 622, where, the data for the transaction 622 includes commit times 624 (e.g., the designated future time $t_1$, the designated future time $t_1$, the designated future time $t_3$, etc.), abort times 626 (e.g., the predetermined abort time $t_{a1}$, the predetermined abort time $t_{a2}$, etc.), responses from remote servers (e.g., the responses from the remote servers $R_{104-1}(t_1)$ to $R_{104-1}(t_1)$, etc.), and operations 630 associated with the transaction 622.

In some embodiments, the programs or modules identified above correspond to sets of instructions for performing a function described above. The sets of instructions can be executed by one or more processors (e.g., the CPUs 602). The above identified modules or programs (i.e., sets of instructions) need not be implemented as separate software programs, procedures or modules, and thus various subsets of these programs or modules may be combined or otherwise re-arranged in various embodiments. In some embodiments, memory 610 stores a subset of the modules and data structures identified above. Furthermore, memory 610 may store additional modules and data structures not described above.

Although FIG. 6 shows a "server," FIG. 6 is intended more as functional description of the various features which may be present in a set of servers than as a structural schematic of the embodiments described herein. In practice, and as recognized by those of ordinary skill in the art, items shown separately could be combined and some items could be separated. For example, some items shown separately in FIG. 6 could be implemented on single servers and single items could be implemented by one or more servers. The actual number of servers used to implement a server and how features are allocated among them will vary from one implementation to another, and may depend in part on the amount of data traffic that the system must handle during peak usage periods as well as during average usage periods.

Figure 7:
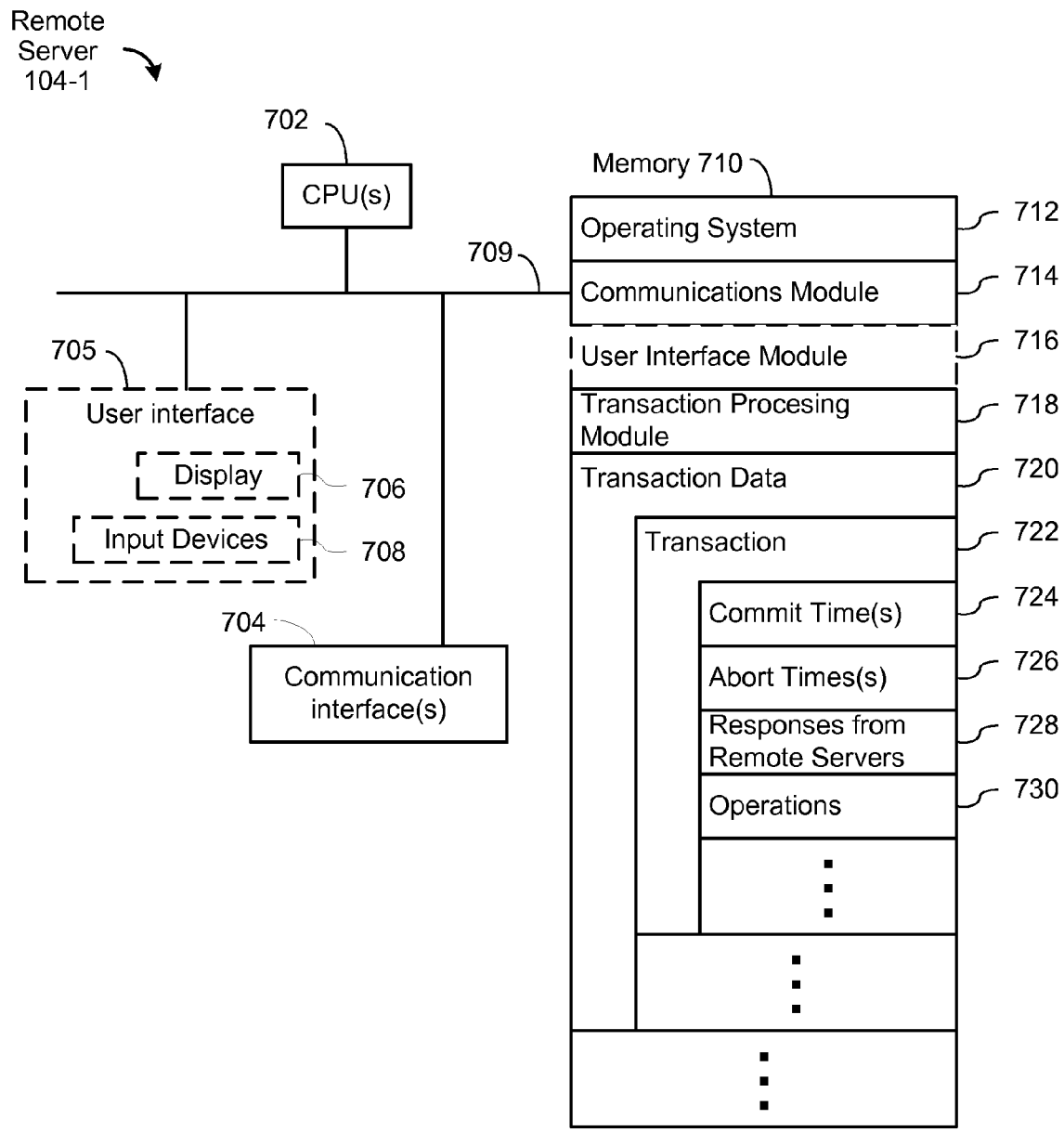
FIG. 7 is a block diagram illustrating a remote server, according to some embodiments.

FIG. 7 is a block diagram illustrating the remote server 104-1, according to some embodiments. Note that although the following discussion refers to the remote server 104-1, the following discussion may apply to any of the remote servers 104-1 to 104-N. The remote server 104-1 typically includes one or more processing units (CPU's, sometimes called processors) 702 for executing programs (e.g., programs stored in memory 710), one or more network or other communications interfaces 704, memory 710, and one or more communication buses 709 for interconnecting these components. The communication buses 709 may include circuitry (sometimes called a chipset) that interconnects and controls communications between system components. The remote server 104-1 optionally includes (but typically does not include) a user interface 705 comprising a display device 706 and input devices 708 (e.g., keyboard, mouse, touch screen, keypads, etc.). Memory 710 includes high-speed random access memory, such as DRAM, SRAM, DDR RAM or other random access solid state memory devices; and typically includes non-volatile memory, such as one or more magnetic disk storage devices, optical disk storage devices, flash memory devices, or other non-volatile solid state storage devices. Memory 710 optionally includes one or more storage devices remotely located from the CPU(s) 702. Memory 710, or alternately the non-volatile memory device(s) within memory 710, comprises a non-transitory computer readable storage medium. In some embodiments, memory 710 or the computer readable storage medium of memory 710 stores the following programs, modules and data structures, or a subset thereof:

- an operating system 712 that includes procedures for handling various basic system services and for performing hardware dependent tasks;
- a communication module 714 that is used for connecting the remote server 104-1 to other computers via the one or more communication interfaces 704 (wired or wireless) and one or more communication networks, such as the Internet, other wide area networks, local area networks, metropolitan area networks, and so on;
- a user interface module 716 that receives commands from the user via the input devices 708 and generates user interface objects in the display device 706;
- a transaction processing module 718 that issues commit requests and commit commands to remote servers, and/or that performs transactions, as described herein; and transaction data 720 including data for transaction 722, where, the data for the transaction 722 includes commit times 724 (e.g., the designated future time $t_1$, the designated future time $t_1$, the designated future time $t_3$, etc.), abort times 726 (e.g., the predetermined abort time $t_{a1}$, the predetermined abort time $t_{a2}$, etc.), responses from remote servers (e.g., the responses from the remote servers $R_{104\text{-}1}(t_1)$ to $R_{104\text{-}1}(t_1)$, etc.), and operations 730 associated with the transaction 722.

In some embodiments, the programs or modules identified above correspond to sets of instructions for performing a function described above. The sets of instructions can be executed by one or more processors (e.g., the CPUs 702). The above identified modules or programs (i.e., sets of instructions) need not be implemented as separate software programs, procedures or modules, and thus various subsets of these programs or modules may be combined or otherwise re-arranged in various embodiments. In some embodiments, memory 710 stores a subset of the modules and data structures identified above. Furthermore, memory 710 may store additional modules and data structures not described above.

Although FIG. 7 shows a "remote server," FIG. 7 is intended more as functional description of the various features which may be present in a set of remote servers than as a structural schematic of the embodiments described herein. In practice, and as recognized by those of ordinary skill in the art, items shown separately could be combined and some items could be separated. For example, some items shown separately in FIG. 7 could be implemented on single servers and single items could be implemented by one or more servers. The actual number of servers used to implement a remote server and how features are allocated among them will vary from one implementation to another, and may depend in part on the amount of data traffic that the system must handle during peak usage periods as well as during average usage periods.

Committing Transactions on Remote Servers

Figure 8:
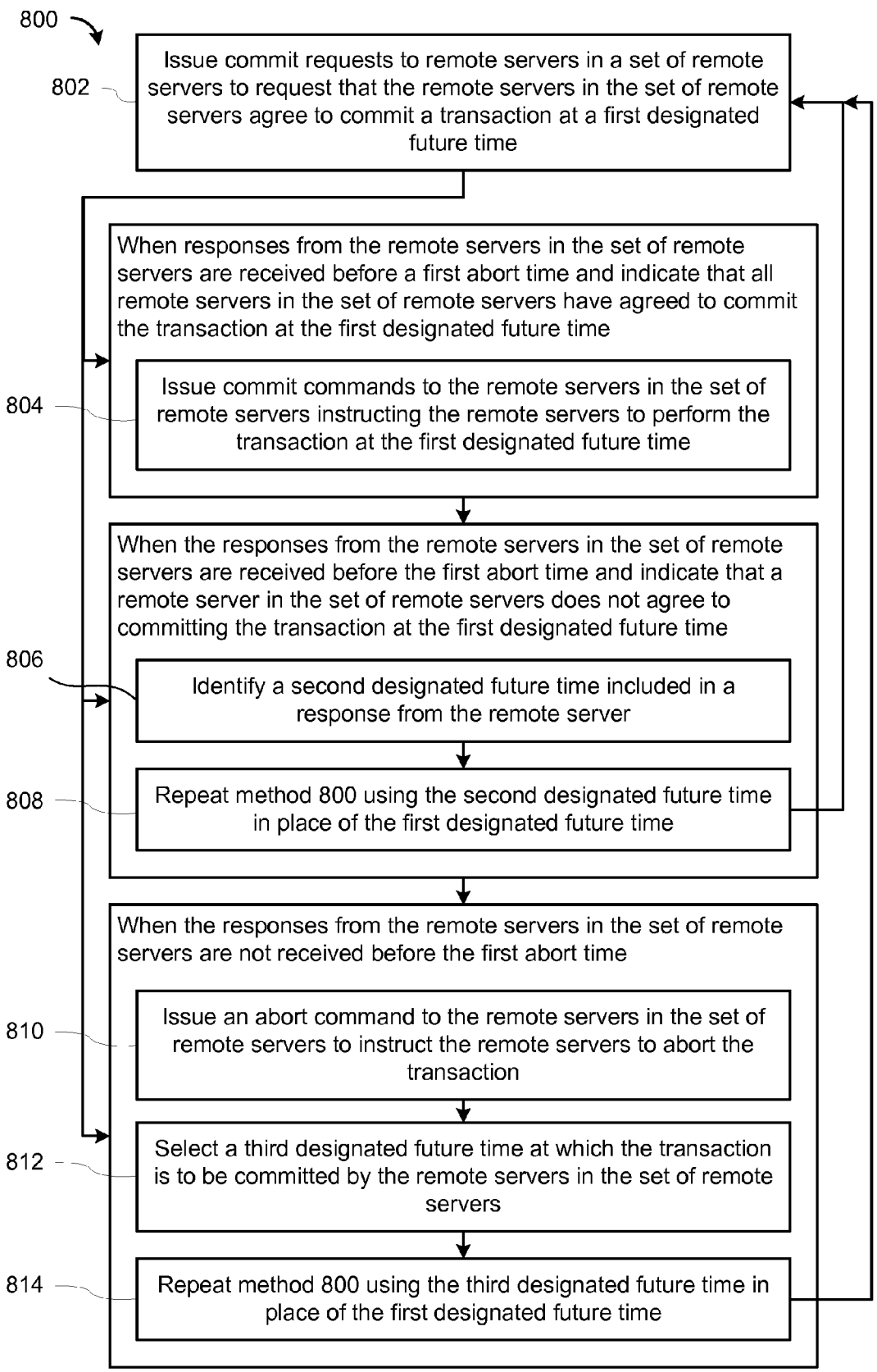
FIG. 8 is a flowchart of a method for committing transactions on remote servers, according to some embodiments.

FIG. 8 is a flowchart of a method 800 for committing transactions on remote servers, according to some embodiments. The transaction processing module 618 issues (802) commit requests to remote servers in a set of remote servers to request that the remote servers in the set of remote servers agree to commit a transaction at a first designated future time (e.g., $CR(t_1)$ in FIG. 2A). When responses from the remote servers in the set of remote servers are received before a first abort time (e.g., $t_{a1}$) and indicate that all remote servers in the set of remote servers have agreed to commit the transaction at the first designated future time, the transaction processing module 618 issues (804) commit commands to the remote servers in the set of remote servers to instruct the remote servers to perform the transaction at the first designated future time (e.g., $C(t_1)$). In some embodiments, the first abort time is a time between a current time and the first designated future time. In some embodiments, the transaction includes an operation to modify a schema of a database. In some embodiments, the transaction includes an operation to add an index to a database. In some embodiments, the commit requests include the operations associated with the transaction.

When the responses from the remote servers in the set of remote servers are received before the first abort time and indicate that a remote server in the set of remote servers does not agree to committing the transaction at the first designated future time (e.g., $R_{104\text{-}4}(t_2)$ in FIG. 3B), the transaction processing module 618 identifies (806) a second designated future time included in a response from the remote server (e.g., the designated future time $t_2$ included in $R_{104\text{-}4}(t_2)$ in FIG. 3B), where the second designated future time is a time later than the first designated future time, and repeats (808) the operations of the method 800 using the second designated future time in place of the first designated future time.

When the responses from the remote servers in the set of remote servers are not received before the first abort time, the transaction processing module 618 issues (810) an abort command to the remote servers in the set of remote servers to instruct the remote servers to abort the transaction, selects (812) a third designated future time at which the transaction is to be committed by the remote servers in the set of remote servers (e.g., the designated future time $t_3$ in FIG. 4C), where the third designated future time is a time later than the first designated future time, and repeats (814) the operations of the method 800 using the third designated future time in place of the first designated future time.

Note that although the discussion above refers to the transaction processing module 618 performing the operations illustrated in FIG. 8, these operations may be performed by any module (or modules) of the server 102 (or any other computer system).

Committing Transactions on Remote Servers

Figure 9A:
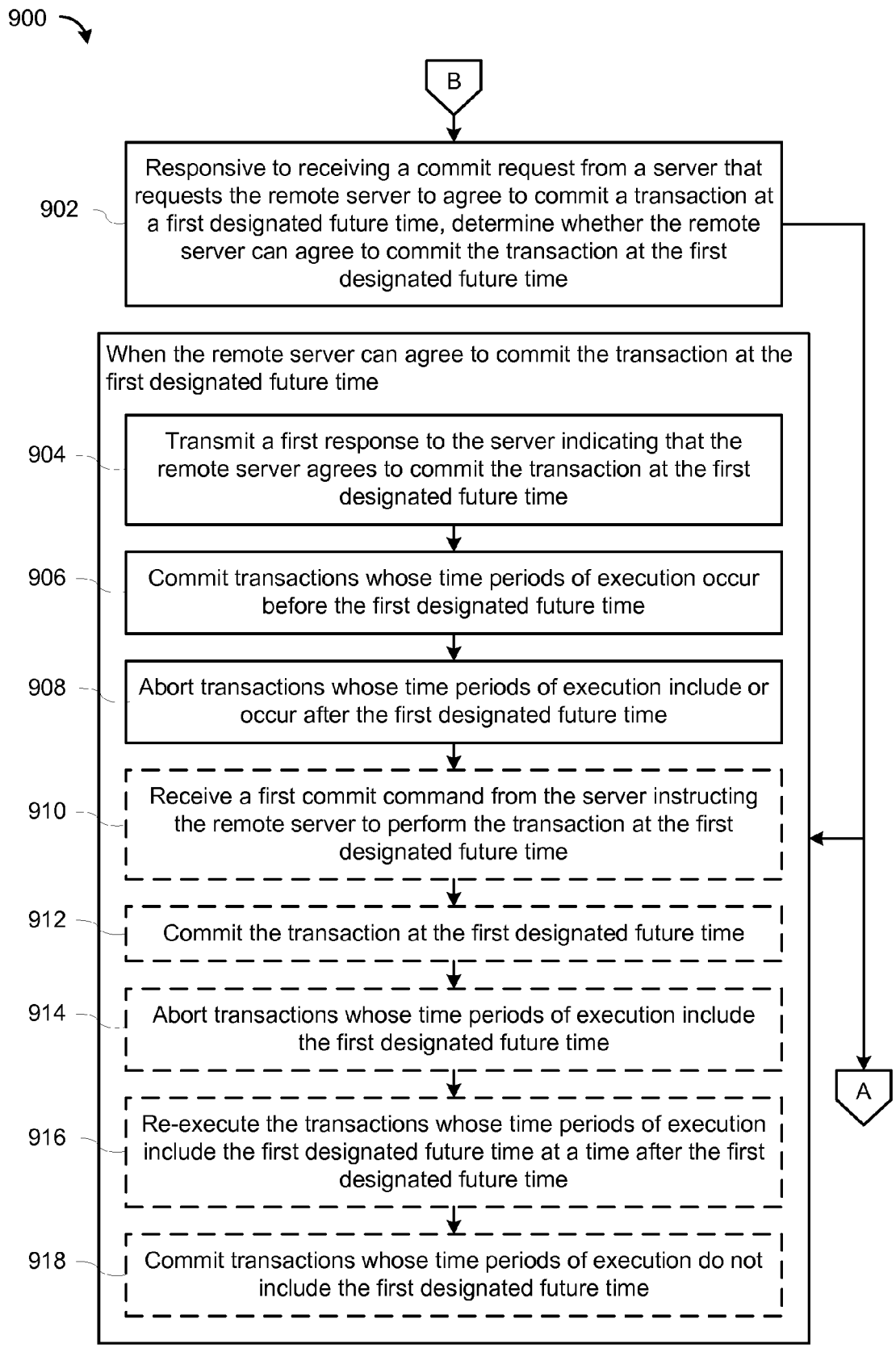
FIG. 9A is a flowchart of a method for committing transactions, according to some embodiments.
Figure 9B:
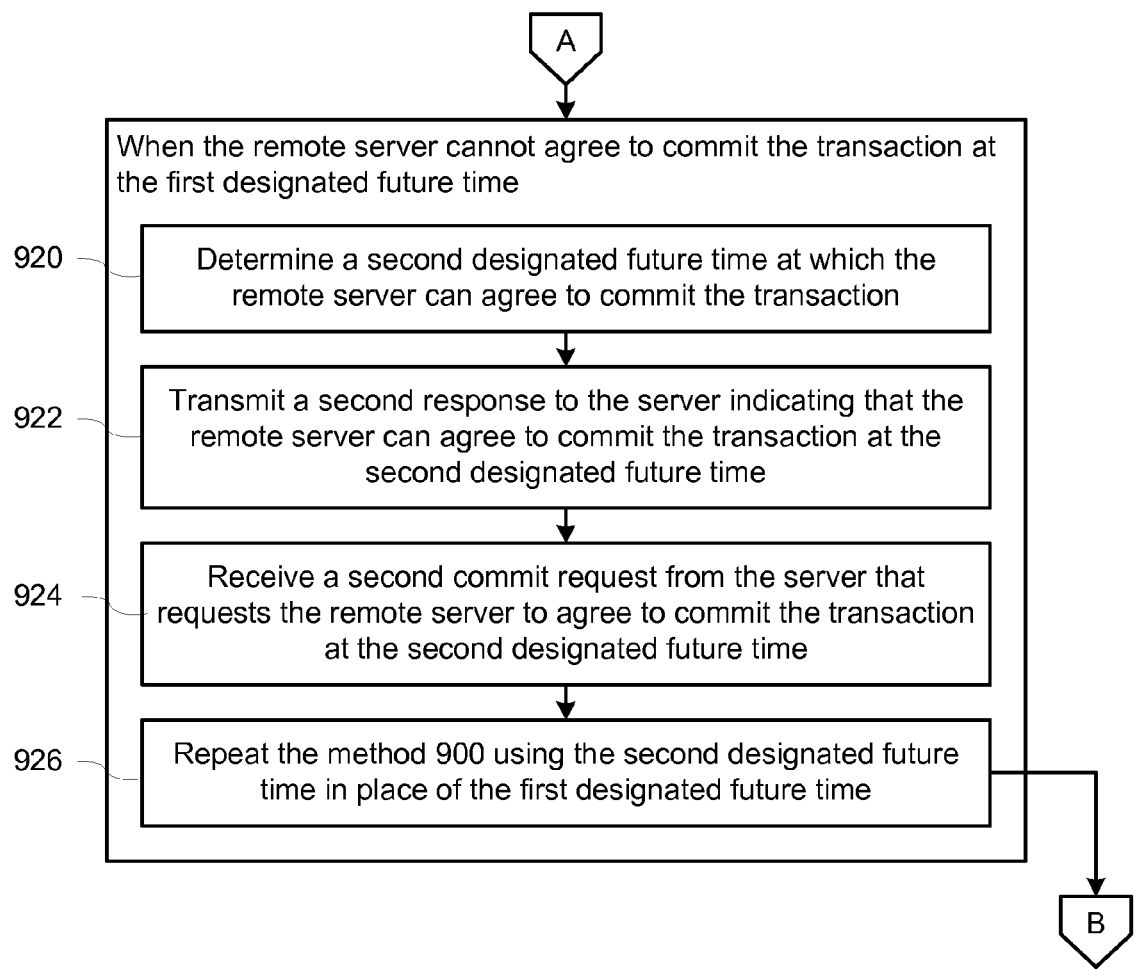
FIG. 9B continues the method illustrated in FIG. 9A, according to some embodiments.

FIGS. 9A-9B are flowcharts of a method 900 for committing transactions, according to some embodiments. Responsive to receiving a commit request (e.g., $CR(t_1)$ in FIG. 2A) from the server 102 that requests the remote server 104-1 to agree to commit a transaction at a first designated future time (e.g., the designated future time $t_1$ in FIG. 2A), the transaction processing module 718 determines (902) whether the remote server 104-1 can agree to commit the transaction at the first designated future time.

When the remote server 104-1 can agree to commit the transaction at the first designated future time, the transaction processing module 718 transmits (904) a first response to the server 102 indicating that the remote server 104-1 agrees to commit the transaction at the first designated future time (e.g., $R_{104\text{-}1}(t_1)$ in FIG. 2B). The transaction processing module 718 commits (906) transactions whose time periods of execution occur before the first designated future time (e.g., the other transactions 502, 504, and 506 in FIG. 5A). The transaction processing module 718 aborts (908) transactions whose time periods of execution include or occur after the first designated future time (e.g., the other transactions 508, 510, and 512 of FIG. 5A). Note that operations 906 and 908 may be performed currently. For example, the remote server 104-1 may concurrently (1) commit transactions and (2) abort other transactions.

In some embodiments, after the remote server 104-1 transmits the first response to the server 102 indicating that the remote server 104-1 agrees to commit the transaction at the first designated future time, the transaction processing module 718 receives (910) a first commit command from the server 102 instructing the remote server 104-1 to perform the transaction at the first designated future time (e.g., $C(t_1)$ in FIG. 2C) and commits (912) the transaction at the first designated future time. The transaction processing module 718 aborts (914) transactions whose time periods of execution include the first designated future time (e.g., the other transaction 508 of FIG. 5B) and re-executes (916) the transactions whose time periods of execution include the first designated future time at a time after the first designated future time (e.g., the other transaction 508 of FIG. 5B). The transaction processing module 718 also commits (918) transactions whose time periods of execution do not include the first designated future time (e.g., the other transactions 502, 504, 506, 510, and 512 in FIG. 5B). Note that operations 914, 916, and 918 may be performed currently. Also note that in some instances, operations 910 to 918 may not be performed by the remote server 104-1 because the server 102 may determine that the transaction should be aborted (e.g., a response to a commit request is received by the server 102 after a predetermined abort time, a remote server proposes a new designated future time at which the transaction is to be committed by the remote servers, etc.).

When the remote server cannot agree to commit the transaction at the first designated future time, the remote server 104-1 determines (920) a second designated future time at which the remote server 104-1 can agree to commit the transaction (e.g., the designated future time $t_2$ in FIG. 3B), where the second designated future time is a time later than the first designated future time and transmits (922) a second response to the server 102 indicating that the remote server can agree to commit the transaction at the second designated future time (e.g., $R_{104-4}(t_2)$ in FIG. 3B). The remote server 104-1 then receives (924) a second commit request from the server 102 that requests the remote server 104-1 to agree to commit the transaction at the second designated future time (e.g., $CR(t_2)$ in FIG. 3C) and repeats (926) the operations of the method 900 using the second designated future time in place of the first designated future time.

Note that although the discussion above refers to the transaction processing module 718 performing the operations illustrated in FIG. 9, these operations may be performed by any module (or modules) of the remote server 104-1 (or any other computer system).

The methods illustrated in FIGS. 8-9 may be governed by instructions that are stored in a computer readable storage medium and that are executed by at least one processor of at least one server. Each of the operations shown in FIGS. 8-9 may correspond to instructions stored in a non-transitory computer memory or computer readable storage medium. In various implementations, the non-transitory computer readable storage medium includes a magnetic or optical disk storage device, solid state storage devices such as Flash memory, or other non-volatile memory device or devices. The computer readable instructions stored on the non-transitory computer readable storage medium may be in source code, assembly language code, object code, or other instruction format that is interpreted and/or executable by one or more processors.

Plural instances may be provided for components, operations or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the implementation(s). In general, structures and functionality presented as separate components in the example configurations may be implemented as a combined structure or component. Similarly, structures and functionality presented as a single component may be implemented as separate components. These and other variations, modifications, additions, and improvements fall within the scope of the implementation(s).

It will also be understood that, although the terms "first," "second," etc. may be used herein to describe various elements, these elements should not be limited by these terms. These terms are only used to distinguish one element from another. For example, a first contact could be termed a second contact, and, similarly, a second contact could be termed a first contact, which changing the meaning of the description, so long as all occurrences of the "first contact" are renamed consistently and all occurrences of the second contact are renamed consistently. The first contact and the second contact are both contacts, but they are not the same contact.

The terminology used herein is for the purpose of describing particular implementations only and is not intended to be limiting of the claims. As used in the description of the implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined (that a stated condition precedent is true)" or "if (a stated condition precedent is true)" or "when (a stated condition precedent is true)" may be construed to mean "upon determining" or "in response to determining" or "in accordance with a determination" or "upon detecting" or "in response to detecting" that the stated condition precedent is true, depending on the context.

The foregoing description included example systems, methods, techniques, instruction sequences, and computing machine program products that embody illustrative implementations. For purposes of explanation, numerous specific details were set forth in order to provide an understanding of various implementations of the inventive subject matter. It will be evident, however, to those skilled in the art that implementations of the inventive subject matter may be practiced without these specific details. In general, well-known instruction instances, protocols, structures and techniques have not been shown in detail.

The foregoing description, for purpose of explanation, has been described with reference to specific implementations. However, the illustrative discussions above are not intended to be exhaustive or to limit the implementations to the precise forms disclosed. Many modifications and variations are possible in view of the above teachings. The implementations were chosen and described in order to best explain the principles and their practical applications, to thereby enable others skilled in the art to best utilize the implementations and various implementations with various modifications as are suited to the particular use contemplated.

What is claimed is:

1. A computer-implemented method for updating a database in a distributed storage system having a server and a plurality of remote servers, each of the server and the remote servers having at least one processor and memory storing at least one program configured for execution by the at least one processor to perform the method, comprising:
   at the server:
      receiving a request to update structure of the database, wherein the requested update specifies modification of a schema of the database or specifies creation of an index for the database;

issuing commit requests to the remote servers, requesting that each of the remote servers agree to commit a first transaction for the database structure update at a first designated future time selected by the server; and when responses from the remote servers are received before a first abort time and indicate that all of the remote servers have agreed to commit the first transaction at the first designated future time, issuing commit commands to the remote servers to instruct the remote servers to commit the first transaction at the first designated future time;

at each of the remote servers, after receiving the respective commit request:

when a time period of execution of a second transaction occurs before the first designated future time, committing the second transaction; and when a time period of execution of a third transaction includes the first designated future time, aborting the third transaction.

2. The computer-implemented method of claim 1, wherein when the responses from the remote servers are received before the first abort time and indicate that at least one of the remote servers does not agree to committing the first transaction at the first designated future time, the method includes at the server:

identifying a second designated future time that is a time later than the first designated future time; and performing the operations of issuing commit requests and issuing commit commands using the second designated future time in place of the first designated future time.

3. The computer-implemented method of claim 1, wherein when the responses from the remote servers are not received before the first abort time, the method includes at the server:

issuing an abort command to the remote servers to instruct the remote servers to abort the first transaction;

selecting a second designated future time at which the first transaction is to be committed by the remote servers, wherein the second designated future time is a time later than the first designated future time; and performing the operations of issuing commit requests and issuing commit commands using the second designated future time in place of the first designated future time.

4. The computer-implemented method of claim 1, wherein the first abort time is a time between a current time and the first designated future time.

5. A distributed storage system having a server and a plurality of remote servers, each of the server and remote servers comprising:

at least one processor;
memory; and
at least one program stored in the memory and executable by the at least one processor, the at least one program comprising instructions for:
at the server:
receiving a request to update structure of a database stored in the distributed storage system, wherein the requested update specifies modification of a schema of the database or specifies creation of an index for the database;

issuing commit requests to the remote servers, requesting that each of the remote servers agree to commit a first transaction for the database structure update at a first designated future time selected by the server; and when responses from the remote servers are received before a first abort time and indicate that all of the remote servers have agreed to commit the first transaction at the first designated future time, issuing commit commands to the remote servers to instruct the remote servers to commit the first transaction at the first designated future time;

at each of the remote servers, after receiving the respective commit request:

when a time period of execution of a second transaction occurs before the first designated future time, committing the second transaction; and when a time period of execution of a third transaction includes the first designated future time, aborting the third transaction.

6. The distributed storage system of claim 5, wherein when the responses from the remote servers are received before the first abort time and indicate that at least one of the remote servers does not agree to committing the first transaction at the first designated future time, the at least one program includes instructions that execute at the server for:

identifying a second designated future time that is a time later than the first designated future time; and performing the operations of issuing commit requests and issuing commit commands using the second designated future time in place of the first designated future time.

7. The distributed storage system of claim 5, wherein when the responses from the remote servers are not received before the first abort time, the at least one program includes instructions that execute at the server for:

issuing an abort command to the remote servers to instruct the remote servers to abort the first transaction;

selecting a second designated future time at which the first transaction is to be committed by the remote servers, wherein the second designated future time is a time later than the first designated future time; and performing the operations of issuing commit requests and issuing commit commands using the second designated future time in place of the first designated future time.

8. The distributed storage system of claim 5, wherein the first abort time is a time between a current time and the first designated future time.

9. A non-transitory computer readable storage medium storing at least one program configured for execution by a distributed storage system having a server and a plurality of remote servers, the at least one program comprising instructions for:

at the server:
receiving a request to update structure of a database stored in the distributed storage system, wherein the requested update specifies modification of a schema of the database or specifies creation of an index for the database;

issuing commit requests to the remote servers, requesting that each of the remote servers agree to commit a first transaction for the database structure update at a first designated future time selected by the server; and when responses from the remote servers are received before a first abort time and indicate that all of the remote servers have agreed to commit the first transaction at the first designated future time, issuing commit commands to the remote servers to instruct the remote servers to commit the first transaction at the first designated future time;

at each of the remote servers, after receiving the respective commit request:

when a time period of execution of a second transaction occurs before the first designated future time, committing the second transaction; and when a time period of execution of a third transaction includes the first designated future time, aborting the third transaction.

10. The non-transitory computer readable storage medium of claim 9, wherein when the responses from the remote servers are received before the first abort time and indicate that at least one of the remote servers does not agree to committing the first transaction at the first designated future time, the at least one program includes instructions for:

identifying a second designated future time that is a time later than the first designated future time; and performing the operations of issuing commit requests and issuing commit commands using the second designated future time in place of the first designated future time.

11. The non-transitory computer readable storage medium of claim 9, wherein when the responses from the remote servers are not received before the first abort time, the at least one program includes instructions for:

issuing an abort command to the remote servers to instruct the remote servers to abort the first transaction;

selecting a second designated future time at which the first transaction is to be committed by the remote servers, wherein the second designated future time is a time later than the first designated future time; and performing the operations of issuing commit requests and issuing commit commands using the second designated future time in place of the first designated future time.

12. The non-transitory computer readable storage medium of claim 9, wherein the first abort time is a time between a current time and the first designated future time.

13. A computer-implemented method for updating a database in a distributed storage system having a server and a plurality of remote servers, each of the server and remote servers having at least one processor and memory storing at least one program configured for execution by the at least one processor to perform the method, comprising:

at each of the remote servers:

receiving a commit request from the server that requests the remote server to agree to commit a first transaction at a first designated future time selected by the server, wherein the first transaction specifies modification of a schema of the database or specifies creation of an index for the database;

in response to receiving the request:

determining whether the remote server can agree to commit the first transaction at the first designated future time; and when the remote server can agree to commit the first transaction at the first designated future time;

transmitting a respective response to the server indicating that the remote server agrees to commit the first transaction at the first designated future time;

when a time period of execution of a second transaction occurs before the first designated future time, committing the second transaction; and when a time period of execution of a third transaction includes the first designated future time, aborting the third transaction.

14. The computer-implemented method of claim 13, wherein after transmitting the respective response to the server, the method includes:

receiving a first commit command from the server instructing the remote server to commit the first transaction at the first designated future time; and committing the first transaction at the first designated future time.

15. The computer-implemented method of claim 14, wherein after receiving the first commit command, the method includes, when the third transaction is aborted:

re-executing the third transaction at a time after the first designated future time.

16. The computer-implemented method of claim 13, wherein when the remote server cannot agree to commit the first transaction at the first designated future time, the method includes:

determining a second designated future time at which the remote server can agree to commit the first transaction, wherein the second designated future time is a time later than the first designated future time; and transmitting the second designated future time to the server indicating that the remote server can agree to commit the first transaction at the second designated future time.

* * * * *